(12) United States Patent
del Pozo de Poza

(10) Patent No.: US 8,965,673 B2
(45) Date of Patent: Feb. 24, 2015

(54) CONFLICT DETECTION AND RESOLUTION USING PREDICTED AIRCRAFT TRAJECTORIES

(71) Applicant: The Boeing Company, Chicago, IL (US)

(72) Inventor: Isabel del Pozo de Poza, Munich (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/902,501

(22) Filed: May 24, 2013

(65) Prior Publication Data

US 2013/0332059 A1 Dec. 12, 2013

(30) Foreign Application Priority Data

May 25, 2012 (EP) .................................. 12382210

(51) Int. Cl.
*G08G 5/00* (2006.01)
*G06Q 10/04* (2012.01)
*G08G 5/04* (2006.01)

(52) U.S. Cl.
CPC ............ *G08G 5/0095* (2013.01); *G06Q 10/047* (2013.01); *G08G 5/0013* (2013.01); *G08G 5/0039* (2013.01); *G08G 5/0043* (2013.01); *G08G 5/0082* (2013.01); *G08G 5/045* (2013.01); *Y02T 50/84* (2013.01)
USPC .......................................... 701/123; 701/120

(58) Field of Classification Search
USPC ................................................ 701/123, 120
See application file for complete search history.

(56) References Cited

U.S. PATENT DOCUMENTS

| 6,885,340 B2 | 4/2005 | Smith et al. |
| 6,950,037 B1 | 9/2005 | Clavier et al. |
| 7,623,957 B2 | 11/2009 | Bui et al. |
| 8,560,148 B2 | 10/2013 | Torres et al. |
| 8,594,917 B2 | 11/2013 | Sawhill et al. |
| 2005/0156777 A1 | 7/2005 | King et al. |
| 2006/0146048 A1 | 7/2006 | Wright et al. |
| 2007/0222665 A1 | 9/2007 | Koeneman |
| 2008/0059052 A1 | 3/2008 | Bui et al. |
| 2009/0012660 A1 | 1/2009 | Roberts et al. |

(Continued)

FOREIGN PATENT DOCUMENTS

EP 2040137 A1 3/2009

OTHER PUBLICATIONS

Pallottino et al., Conflict Resolution Problems for Air Traffic Management Systems Solved with Mixed Integer Programming, IEEE Transactions on Intelligent Transportation Systems, vol. 3, No. 1, Mar. 2002.*

(Continued)

*Primary Examiner* — Mary Cheung
*Assistant Examiner* — Michael Berns
(74) *Attorney, Agent, or Firm* — Yee & Associates, P.C.

(57) ABSTRACT

This disclosure is concerned with a method of detecting conflicts between aircraft passing through managed airspace, and to resolving the detected conflicts strategically. The method may include obtaining intended trajectories of aircraft through the airspace, detecting conflicts in the intended trajectories, forming a set of the conflicted aircraft, calculating one or more revised trajectories for the conflicted aircraft such that the conflicts are resolved, and advising the conflicted aircraft subject to revised trajectories of the revised trajectories.

11 Claims, 13 Drawing Sheets

(56) References Cited

U.S. PATENT DOCUMENTS

| | | |
|---|---|---|
| 2010/0215435 A1 | 8/2010 | Luo et al. |
| 2010/0241345 A1 | 9/2010 | Cornell et al. |
| 2010/0305781 A1 | 12/2010 | Felix et al. |
| 2011/0077803 A1 | 3/2011 | Dehais et al. |
| 2011/0118981 A1 | 5/2011 | Chamlou |
| 2012/0004837 A1 | 1/2012 | McDonald |
| 2012/0083946 A1 | 4/2012 | Maldonado et al. |
| 2012/0083997 A1 | 4/2012 | Meador et al. |
| 2012/0116614 A1 | 5/2012 | Torres et al. |
| 2012/0158219 A1 | 6/2012 | Durling et al. |
| 2012/0303253 A1 | 11/2012 | Irfan et al. |
| 2013/0085661 A1 | 4/2013 | Chan et al. |
| 2013/0317733 A1 | 11/2013 | Del Pozo de Poza et al. |
| 2013/0317734 A1 | 11/2013 | Vilaplana et al. |
| 2013/0338909 A1 | 12/2013 | Garcia de Blanes et al. |
| 2013/0338910 A1 | 12/2013 | Vilaplana et al. |

OTHER PUBLICATIONS

Garcia De Blanes et al., "Conflict Detection and Resolution Using Predicted Aircraft Trajectories", U.S. Appl. No. 13/902,568 and Preliminary Amendment, filed May 24, 2013, 85 pages.

Del Pozo De Poza et al., "Conflict Detection and Resolution Using Predicted Aircraft Trajectories", U.S. Appl. No. 13/902,632 and Preliminary Amendment, filed May 24, 2013, 102 pages.

Vilaplana et al., "Conflict Detection and Resolution Using Predicted Aircraft Trajectories", U.S. Appl. No. 13/902,672 and Preliminary Amendment, filed May 24, 2013, 80 pages.

Vilaplana et al., "Conflict Dectection and Resolution Using Predicted Aircraft Trajectories", U.S. Appl. No. 13/902,697 and Preliminary Amendment, filed May 24, 2013, 85 pages.

European Search Report, dated Dec. 20, 2012, regarding Application No. EP12382208.2, 15 pages.

Partial European Search Report, dated Dec. 18, 2012, regarding Application No. EP12382206.6, 10 pages.

European Search Report, dated Dec. 20, 2012, regarding Application No. EP12382209.0, 11 pages.

European Search Report, dated Dec. 20, 2012, regarding Application No. EP12382210.8, 16 pages.

Bertsimas et al., "Fairness in Air Traffic Flow Management," Proceedings of the Informs Annual Meeting, Vo. 32, No. 4, Oct. 2009, 27 pages.

Casado, "Application of the Theory of Formal Languages to the Modeling of Trajectory Uncertainty and the Analysis of its Impact in Future Trajectory-Based Operations," First SESAR Innovation Days, Nov. 2011, 1 page. Retrieved May 2, 2013, http://sesarinnovationdays.eu/files/Posters/SID%202011%20Enrique%20Casado.pdf.

Del Pozo De Poza et al., "Assessing Fairness and Equity in Trajectory Based Operations," Proceedings of the 9th AIAA Aviation Technology, Integration, and Operations Conference (ATIO), Sep. 2009, 18 pages.

Galdino et al., "Formal Verification of an Optimal Air Traffic Conflict Resolution and Recovery Alogrithm," Lecture Notes in Computer Science, vol. 4576, Proceedings of the 14th International Workshop on Logic, Language, Information, and Computation (WoLLIC 2007), Jul. 2007, pp. 177-188.

Gallo, "Prediction of Descent Trajectories Based on Aircraft Intent," Proceedings of the 29th IEEE/AIAA Digital Avionics Systems Conference (DASC), Oct. 2010, 16 pages.

Hagen et al., "Stratway—A Modular Approach to Strategic Conflict Resolution," Proceedings of the 11th AIAA Aviation, Technology, Integration, and Operations (ATIO) Conference, Sep. 2011, 13 pages.

Jonker et al., "Efficiency and Fairness in Air Traffic Control," Proceedings of the Seventeenth Belgium-Netherlands Conference on Artificial Intelligence (BNAIC 2005), Oct. 2005, 7 pages.

Karr et al., "Experimental Performance of a Genetic Algorithm for Airborne Strategic Conflict Resolution," Proceedings of the AIAA Guidance, Navigation, and Control Conference, Aug. 2009, 15 pages.

Kuchar et al., "A Review of Conflict Detection and Resolution Modeling Methods," IEEE Transactions on Intelligent Transportation Systems, vol. 1, No. 4, Dec. 2000, pp. 179-189.

Lopez et al., "Towards an Open Test bed for the Study of Trajectory Synchronization in the Future ATM System: The ASIS Initiative," Proceedings of the 2009 Integrated Communications, Navigation, and Surveillance Conference (ICNS '09), May 2009, 14 pages.

Prandini et al., "A Probabilistic Approach to Aircraft Conflict Detection," IEEE Transactions on Intelligent Transportation Systems, vol. 1, No. 4, Dec. 2000, pp. 199-220.

Pourtaklo et al., "Equitable Allocation of Enroute Airspace Resources," Proceedings of the Eighth USA/Europe Air Traffic Management Research and Development Seminar (ATM2009), Jun. 2009, 8 pages.

Ranieri et al., "STREAM—Strategic Trajectory de-confliction to Enable seamless Aircraft conflic Management," First SESAR Innovation Days, Nov. 2011, 8 pages.

Soomers et al., "Fairness in the Aircraft Landing Problem," Proceedings of the 2008 AGIFORS Anna Valicek Medal Competition, Jun. 2008, 19 pages.

Valenzuela et al., "Conflict Resolution in Converging Air Traffic Using Trajectory Patterns," Journal of Guidance, Control, and Dynamics, vol. 34, No. 4, Jul.-Aug. 2011, pp. 1172-1189.

Vilaplana, "Intent Synchronization," Eurocontrol/FAA Workshop on Avionics for 2011 and Beyond, Oct. 2005, 19 pages. Retrieved May 2, 2013, http://www.ecacnav.com/downloads/13.%20INTENT%20SYNC%202005-10-07%20M%20Vilaplana.pdf.

Vivona et al., "Pattern-Based Genetic Algorithm for Airborne Conflict Resolution," Proceedings of the AIAA Guidance, Navigation, and Control Conference and Exhibit, Aug. 2006, pp. 316-338.

Wing et al., "Airborne Tactical Intent-Based Conflict Resolution Capability," Proceedings of the 9th AIAA Aviation, Technology, Integration, and Operations (ATIO) Conference, Sep. 2009, 12 pages.

Office Action, dated Mar. 20, 2014, regarding U.S. Appl. No. 13/902,568, 23 pages.

Notice of Allowance, dated May 20, 2014, regarding U.S. Appl. No. 13/902,568, 5 pages.

European Search Report, dated Jul. 4, 2013, regarding Application No. EP12382206.6, 14 pages.

Office Action, dated Jul. 17, 2014, regarding USPTO U.S. Appl. No. 13/902,697, 34 pages.

Office Action, dated Jan. 7, 2015, regarding USPTO U.S. Appl. No. 13/902,632, 54 pages.

Final Office Action, dated Nov. 28, 2014, regarding USPTO U.S. Appl. No. 13/902,697, 20 pages.

Office Action, dated Jan. 8, 2015, regarding USPTO U.S. Appl. No. 13/902,632, 35 pages.

\* cited by examiner

CONFLICT DETECTION AND RESOLUTION USING PREDICTED AIRCRAFT TRAJECTORIES

This application claims priority to European Patent Application 12382210.8, filed May 25, 2012.

FIELD OF THE DISCLOSURE

This disclosure relates to automating the management of airspace. The present disclosure relates generally to incident analysis, and more particularly to vehicle incident analysis and databases used in performing vehicle incident analysis. In particular, the present disclosure is concerned with detecting conflicts between aircraft passing through managed airspace, and to resolving the detected conflicts strategically.

BACKGROUND TO THE DISCLOSURE

Air traffic management is responsible for the safe passage of aircraft through an airspace. The aircraft may be manned or unmanned. To do this, a centralised, ground-based air traffic management facility must communicate with aircraft flying through the airspace it manages. This two-way communication may be done in a number of ways, including by oral communication such as by radio or by data communication through a data link or the like.

The aircraft may determine their desired flight path through the airspace, for example using an airborne flight management system, and may then communicate this to air traffic management. In modern times, air traffic management uses sophisticated computer systems to check the submitted flight paths do not result in aircraft trajectories that give rise to conflicts. Conflicts between aircraft arise when their intended trajectories would result in a separation falling below the minimum specified. By trajectory, a four-dimensional description of the aircraft's path is meant such as a time-ordered sequence of aircraft states, including position and altitude. Maintaining safe separations is a particularly demanding task, particularly in congested airspace such as around airports where flight paths tend to converge.

In addition to detecting conflicts, air traffic management must have the means to be able to resolve the conflicts and to communicate the necessary changes in trajectories to the conflicted aircraft.

To date, most efforts aimed at air traffic management's ability to detect and resolve air traffic conflicts have focused on crossing traffic patterns and have not dealt with the more challenging problem of converging traffic. This arises, for example, in arrivals management at TRACON (terminal radar control) facilities, where aircraft arrive from many directions and must be sequenced for approach and landing at an airport. The efforts directed to converging traffic consider maximizing the throughput of traffic on an airspace resource such as a sector or a runway as the main or sole objective when solving air traffic conflicts. Existing solutions also focus on planning the arrival sequence first before detecting and resolving conflicts. The method then proceeds by extrapolating that sequence backwards to the earlier waypoints. However, such an approach only serves to propagate the delay backwards to all other aircraft.

Previous attempts at detecting and resolving conflicts suffer other problems. For example, previous attempts have analysed conflicts in isolation from each other, typically as isolated events between pairs of aircraft. The detected conflicts are resolved in a sequential manner without any consideration of the possibility of a "domino effect" feeding back delays.

Recent advances in predicting aircraft trajectories accurately are of benefit to air traffic management. In particular, work on expressing aircraft intent using formal languages provides a common platform for the exchange of flight information and allows different interested parties to perform trajectory calculations. For example, this aids the communication of planned trajectories between aircraft and air traffic management.

EP-A-2,040,137, also in the name of THE BOEING COMPANY®, describes the concept of aircraft intent in more detail, and the disclosure of this application is incorporated herein in its entirety by reference. In essence, aircraft intent is an expression of the intent of how the aircraft is to be flown. The aircraft intent is expressed using a set of parameters presented so as to allow equations of motion governing the aircraft's flight to be solved. The theory of formal languages may be used to implement this formulation. An aircraft intent description language provides the set of instructions and the rules that govern the allowable combinations that express the aircraft intent, and so allow a prediction of the aircraft trajectory.

Flight intent may be provided as an input to an intent generation infrastructure. The intent generation infrastructure may be airborne on an aircraft or it may be land-based such as an air traffic management facility. The intent generation infrastructure determines aircraft intent using the unambiguous instructions provided by the flight intent and other inputs to ensure a set of instructions is provided that will allow an unambiguous trajectory to be calculated. Other inputs may include preferred operational strategies such as preferences with respect to loads (both payload and fuel), how to react to meteorological conditions, preferences for minimising time of flight or cost of flight, maintenance costs, and environmental impact. In addition, other inputs may include constraints on use of airspace to be traversed.

The aircraft intent output by the intent generation infrastructure may be used as an input to a trajectory computation infrastructure. The trajectory computation infrastructure may be either located with or away from the intent generation infrastructure. The trajectory computation infrastructure may comprise a trajectory engine that calculates an unambiguous trajectory using the aircraft intent and other inputs that are required to solve the equations of motion of the aircraft. The other inputs may include data provided by an aircraft performance model and an Earth model. The aircraft performance model provides the values of the aircraft performance aspects required by the trajectory engine to integrate the equations of motion. The Earth model provides information relating to environmental conditions, such as the state of the atmosphere, weather conditions, gravity and magnetic variation.

SUMMARY OF THE DISCLOSURE

Against this background, and from a first aspect, the present invention resides in a computer-implemented method of managing airspace through which a plurality of aircraft are flying.

The method comprises obtaining user preferred aircraft intent data that describe unambiguously user preferred trajectories to be flown by each aircraft through the airspace. The user-preferred aircraft intent data may be a description of the aircraft's user-preferred trajectory expressed in a formal language or may be a full description of how the aircraft is to be operated expressed in a formal language that may be used to calculate a corresponding unique trajectory. The description should address all degrees of freedom of motion of the aircraft, and should define the configuration of the aircraft (e.g. flaps, speed brakes, undercarriage). The description may close all degrees of freedom of motion of the aircraft. The description may completely define the configuration of the aircraft.

The method further comprises obtaining a user preferred time of arrival for each aircraft. The time of arrival may be a runway threshold crossing time.

The user preferred trajectories are calculated from the user preferred aircraft intent data. One or more conflicts in the user preferred trajectories are detected, and the conflicted aircraft predicted to fly the detected conflicting trajectories are identified.

The method further comprises revising the user preferred aircraft intent data of at least one of the conflicted aircraft to produce revised aircraft intent data having a corresponding revised trajectory to resolve conflicts. For each revised trajectory, a penalty function value is calculated from a time penalty. This time penalty arises from a difference between the user preferred time of arrival and the revised time of arrival of the revised trajectory. The time penalty may also reflect the delay to the flight as a result of the revision of the aircraft intent data and corresponding trajectory.

The revised aircraft intent data of at least one aircraft is further revised to produce a corresponding trajectory. The revision is performed in such a way that the penalty function values are distributed among the conflicted aircraft subject to revised trajectories more equitably or more fairly. For example, an aircraft with a large penalty function value may be selected and may have its aircraft intent data revised to ensure it meets better its user preferred time of arrival. This will lead to a reduction in its penalty function value and so lead to a more fair distribution of revisions assuming that a further revision of another aircraft is not necessitated to ensure the trajectories remain conflict free. This process may be repeated for more than one aircraft such that the revised aircraft intent data of many conflicted aircraft are further revised.

When the revisions to the aircraft intent data are complete, the revised aircraft intent data are sent to the corresponding conflicted aircraft.

The above method is particularly suited to arriving at an equitable distribution of trajectory revisions as it treats all aircraft equally and seeks to distribute delays equally among the aircraft.

Detecting conflicts may comprise calculating the position of each aircraft at a sequence of points in time. For each point in time, the positions of pairs of aircraft may be compared to detect conflicts. For example, the distance between the aircraft may be calculated. The distances may be checked against a pre-defined separation minimum, and conflicts detected based upon the distance dropping below the minimum. The lateral and vertical distance between aircraft may be calculated, and conflicts may be detected using one or both of the lateral and vertical distances. Rather than repeatedly calculating distances between a pair of aircraft at each time step of the calculation, predictive methods may be employed. For example, the velocity of the aircraft may be used to determine that the aircraft will not be in conflict for a forthcoming length of time.

Optionally, the method may further comprise obtaining a user preferred fuel consumption for each aircraft. For each revised trajectory, the penalty function value is calculated and may be calculated to include contributions both from the time penalty as discussed above, and also from a fuel penalty arising from a difference between the user preferred fuel consumption and the revised fuel consumption of the revised trajectory. A penalty in fuel consumption may arise due to a prolonged flight time or to a change in how the flight is flown. For example, a climb to a greater height may incur a fuel burn, or a non-optimal descent like a stepped-down approach rather than a continuous descent approach may increase fuel consumption.

The time penalty and fuel consumption penalty may be combined in many different ways. The time and fuel consumption penalties may merely be added. Depending on units chosen for each penalty, one or more scaling factors may be preferred to ensure the time and fuel consumption penalty combine as desired, i.e. such that one penalty does not dominate the other. Negative penalty values may be considered, i.e. an early arrival may be rewarded or alternatively the associated penalty may remain at zero for an early arrival.

As already noted, the above method is particularly suited to arriving at an equitable distribution of trajectory revisions as it treats all aircraft equally. The method may be adapted to provide a fair distribution of trajectory revisions. This allows recognition of the preferences of the airlines operating the aircraft. For example, regard may be paid to different airlines having different priorities with regard to incurring time penalties as opposed to incurring fuel consumption penalties. For example, a low-cost airline is likely to prefer time penalties to fuel-consumption penalties as its business model is based on low cost. To this end, the method may comprise obtaining a cost index indicating a preferred weighting between incurring a time penalty or a fuel penalty. Then, for each revised trajectory, the penalty function value may be calculated as a weighted combination of the time penalty and the fuel penalty, wherein the cost index sets the weighting. This allows a low-cost airline to ensure prominent weighting is given to fuel consumption penalties and so revisions to aircraft intent data will tend to address its aircraft having the greatest increase in fuel consumption rather than those aircraft with the largest delays in time of arrival.

In addition, the method may be further adapted to accommodate how flexible different airlines are. This is advantageous because some airlines may be willing to tolerate larger penalties than others.

Hence, the method may further comprise obtaining a latest time of arrival and a maximum fuel consumption deemed acceptable for each aircraft. For each revised trajectory, a relative penalty function value is calculated from a ratio of the penalty function value and a saturated penalty function value. The saturated penalty function value is calculated from a weighted combination of a maximum time penalty and a maximum fuel penalty, weighted according to the cost index. The maximum time penalty arises from a difference between the latest time of arrival and the revised time of arrival of the revised trajectory. The maximum fuel penalty arises from a difference between the maximum fuel consumption and the revised fuel consumption of the revised trajectory. The step of further revising the revised aircraft intent data of at least one aircraft to produce a corresponding trajectory may be performed such that it is the relative penalty function values that are distributed among the conflicted aircraft subject to revised trajectories more fairly.

Optionally, the step of further revising the revised aircraft intent data of at least one aircraft may comprise selecting the aircraft with the greatest relative penalty function value. The method may then comprise repeating multiple times the step of further revising the revised aircraft intent data by selecting further aircraft by decreasing order of size of their relative penalty function values.

In addition, the method may account for how affected the different airlines are by the revisions to their aircraft intent data in a fair way. That is, the method may target the airlines in order, seeking to improve the revised trajectories of the airlines seeing the highest relative penalty function values. For example, the method may comprise, for each airline, calculating an airline relative penalty function value as a combination of the individual relative penalty function values of the aircraft with revised aircraft intent data associated with that airline. Then, the step of further revising the revised aircraft intent data of at least one aircraft may comprise selecting an aircraft from the airline with the greatest airline relative penalty function value. Optionally the step of further revising the revised aircraft intent data may be repeated multiple times, each time selecting aircraft from the airlines, and moving form airline to airline in decreasing order of the size of their airline relative penalty function values.

In addition to paying regard to how flexible an airline is with respect to the size of penalties it is willing to tolerate, regard may also be paid to the fact that an airline may be willing to tolerate larger penalties for some flights as opposed to others. This allows an airline to prioritise flights. For example, the method may further comprise obtaining aircraft weighting data comprising a weighting factor for each aircraft that indicates the relative importance of the flight of each aircraft to an airline. The step of further revising the revised aircraft intent data may be applied sequentially to a series of aircraft. The aircraft may be selected as follows.

First, the aircraft of the most unfairly treated airline may be considered first. That is, an aircraft is selected from the airline with the greatest airline relative penalty function value. From that airline's aircraft, the aircraft with the greatest combination of weighting factor and aircraft relative penalty function value is selected. Thus the selection of the aircraft reflects both the penalties incurred by that aircraft's revised aircraft intent data and also the importance of that aircraft to the airline. Further aircraft may be selected from that airline for further revision of aircraft intent data, and these aircraft may be selected in decreasing order of the size of the combination of their weighting factor and their aircraft relative penalty function value. When the consideration of the aircraft from one airline is complete, aircraft from other airlines may be considered. Selection of airlines may be ordered according to decreasing airline relative penalty function values. For each airline, the aircraft are considered in the ordered way described above with respect to the first airline considered.

Different ways of revising trajectories and ensuring an equitable or fair distribution amongst the revised trajectories are contemplated. For example, revised trajectories that remove all conflicts may first be calculated, and then the revised trajectories may be further revised in order to improve on the equity or fairness of the distribution of revised trajectories. Alternatively, functions may be used to reflect the equity or fairness during the calculations of the revised trajectories such that the calculation is one-step, without the need for further revisions.

BRIEF DESCRIPTION OF THE DRAWINGS

In order that the present disclosure may be more readily understood, preferred embodiments will now be described, by way of example only, with reference to the accompanying drawings in which.

DETAILED DESCRIPTION OF THE DISCLOSURE

The present disclosure provides methods and systems that enable a ground-based airspace management system to de-conflict strategically the trajectories of aircraft under its responsibility, regardless of whether the aircraft are manned or unmanned, in any traffic scenario including converging traffic patterns.

System Overview

Figure 1:
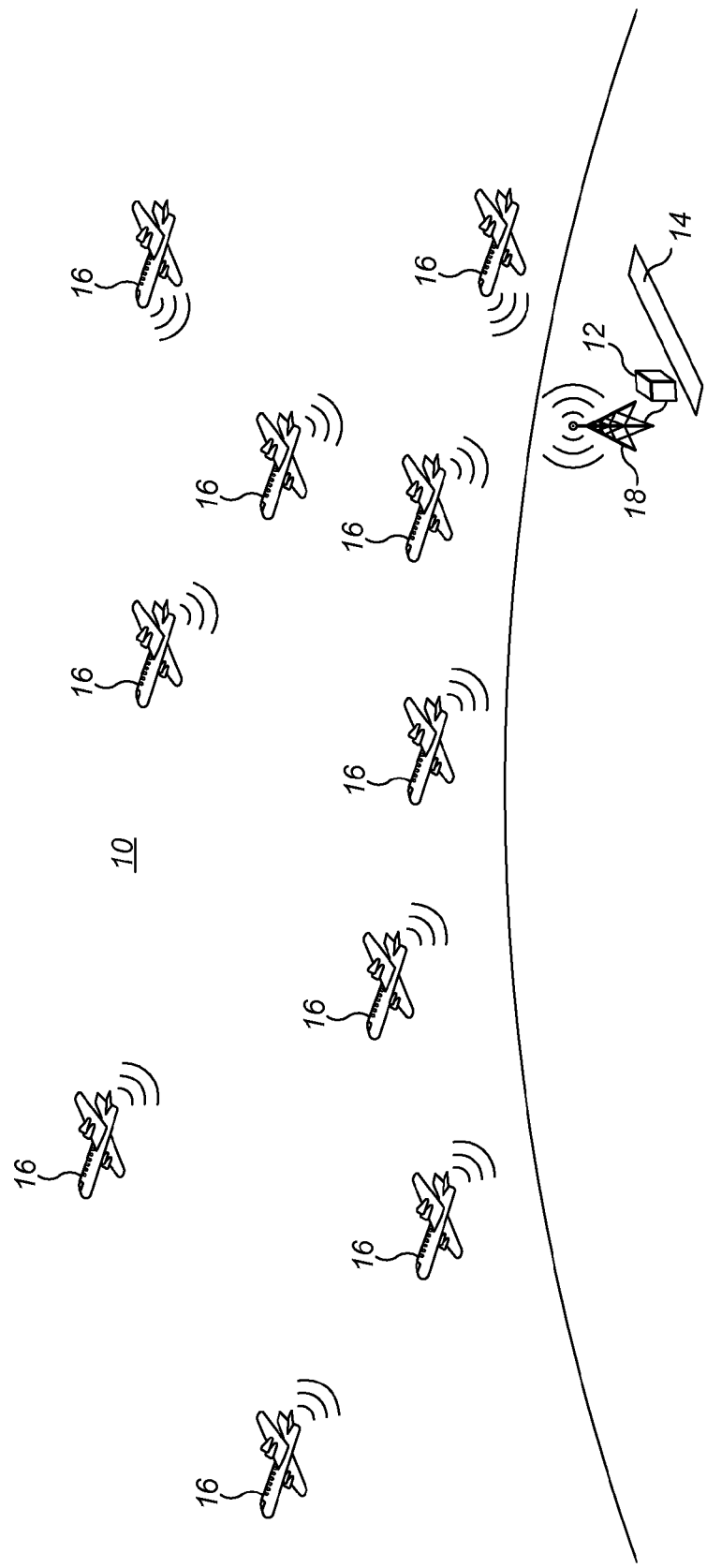
FIG. 1 is a schematic diagram showing aircraft flying within an airspace managed by an air traffic management facility.

FIG. 1 shows schematically an airspace 10 under the control of air traffic management facility 12. In this example, air traffic management 12 is located at an airport 14 and is responsible for aircraft 16 arriving and departing from the airport 14, as well as those aircraft 16 passing through the airspace 10.

Air traffic management 12 is provided with associated communication means 18 to allow two-way communication with the aircraft 16 flying through the airspace 10. The aircraft 16 are equipped with complementary communication equipment (not shown in FIG. 1) of any type well known in the field of aerospace. For example, communication may be effected by radio or could be effected using a data link such as ADS-B.

Communication between air traffic management 12 and each of the aircraft 16 is generally the same, and may be effected either in parallel or serially. A framework illustrating the relationship between air traffic management 12 and one of the aircraft 16 will now be described in more detail. It is to be understood that this framework is common to all the aircraft in the sense that it is the same for any aircraft 16 chosen to be considered.

Figure 2:
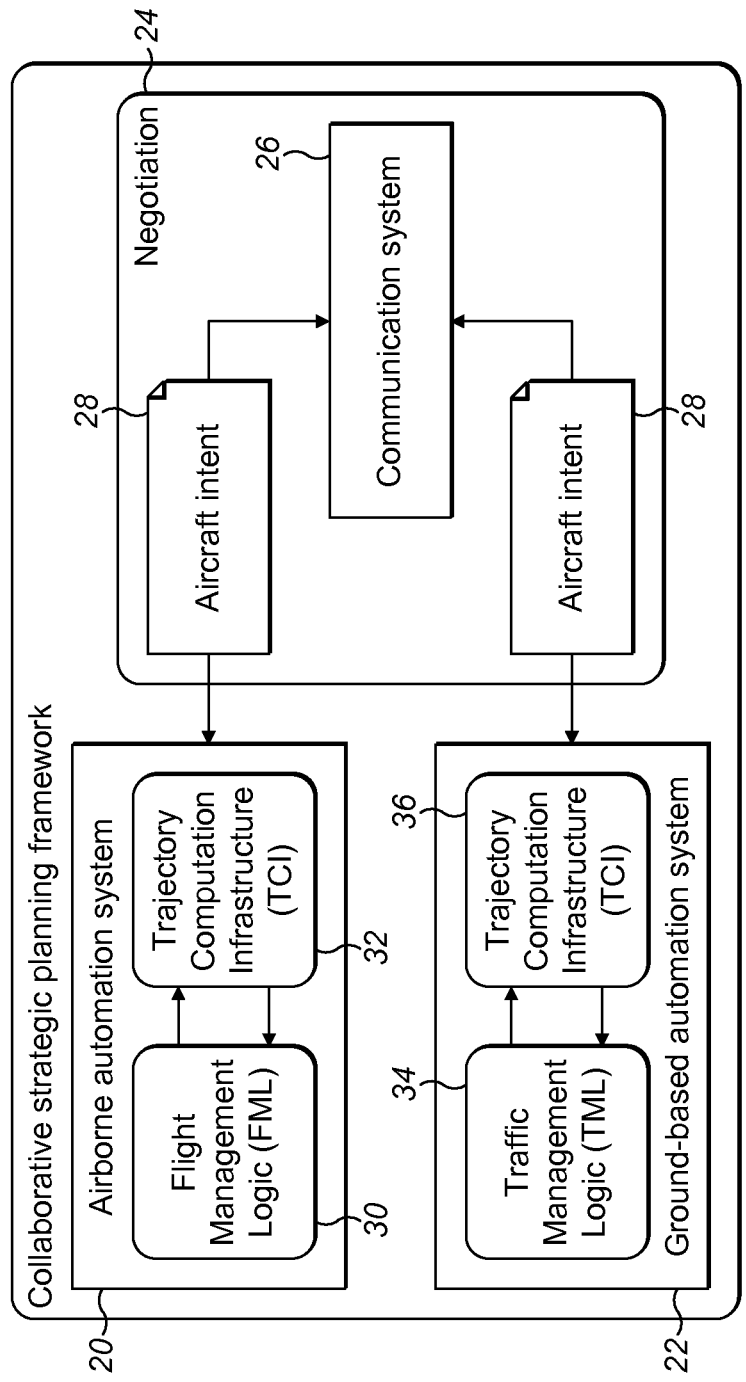
FIG. 2 shows a framework illustrating the relationship between air traffic management and an aircraft flying within the airspace it manages that allows conflict detection and resolution.

FIG. 2 shows schematically the airborne system 20, the ground-based system 22, and the negotiation process 24 that occurs between the airborne system 20 and ground-based system 22. Airborne system 20 is provided by the aircraft 16, and the ground-based system 22 is provided by air traffic management 12. The negotiation process 24 requires a communication system 26 that is distributed between the aircraft 16 and air traffic management 12, namely a transmitter/receiver provided on the aircraft 16 and the communication means 18 provided at the air traffic management facility 12.

In the example of FIG. 2, the communication system 26 is used to exchange aircraft intent data 28 between the airborne automation system 20 and the ground-based automation system 22. The aircraft intent data 28 may be provided by the airborne automation system 20 or by the ground-based automation system 22. The aircraft intent data 28 provided by the airborne automation system 20 will correspond to the user preferred trajectory of the aircraft 16, whereas the aircraft intent data 28 provided by the ground-based automation system 22 will correspond to a revised trajectory determined by air traffic management 12.

The airborne automation system 20 comprises flight management logic 30 and trajectory computation infrastructure 32. Both these components are computer-implemented, preferably as separate computer systems. For example, the flight management logic 30 may be part of a flight computer of the aircraft 16.

The flight management logic 30 is responsible for following and supervising the negotiation process 24 from the aircraft's point of view. The flight management logic 30 is also responsible for defining the user preferred aircraft intent data 28 and agreeing the revised aircraft intent 28 with the ground-based automation system 22.

The trajectory computation infrastructure 32 is responsible for computing the trajectory resulting from a given flight intent 28. For example, it may calculate the trajectory arising from a user preferred aircraft intent for presentation to a pilot for approval before the corresponding user preferred aircraft intent data 28 is provided to the ground-based automation system 22. Additionally, the trajectory computation infrastructure 32 may generate and display a trajectory corresponding to revised aircraft intent data 28 provided by the ground-based automation system 22 such that the pilot may approve the revised trajectory.

The ground-based automation system 22 comprises traffic management logic 34 and trajectory computation infrastructure 36. Both these components are computer-implemented, preferably as separate computer systems. Although the trajectory computation infrastructure 36 performs a similar function to the trajectory computation infrastructure 32 of the airborne automation system 20, it need not be the same and may be implemented differently.

The traffic management logic 34 is responsible for following and supervising the negotiation process 24. The traffic management logic 34 is also responsible for revising aircraft intents where conflicts arise. To enable revision of the aircraft intents, the traffic management logic 34 has at its disposal algorithms relating to a look ahead process that governs when to run a conflict detection process, to conflict detection and to conflict resolution. In this example, the traffic management logic 34 is modular in its nature such that any of the algorithms may be varied or entirely replaced without affecting the other algorithms. This modularity also makes the traffic management logic 34 ideal as a test bed for developing improved algorithms in that revised versions of the algorithm may be readily swapped in and out of the traffic management logic 34.

The trajectory computation infrastructure 36 is responsible for generating trajectories corresponding to aircraft intents at the ground-based automation system 22. The aircraft intent may be the user preferred aircraft intent 28 received from the airborne automation system 20 or the revised aircraft intent 28 determined by the traffic management logic 34.

Figure 3:
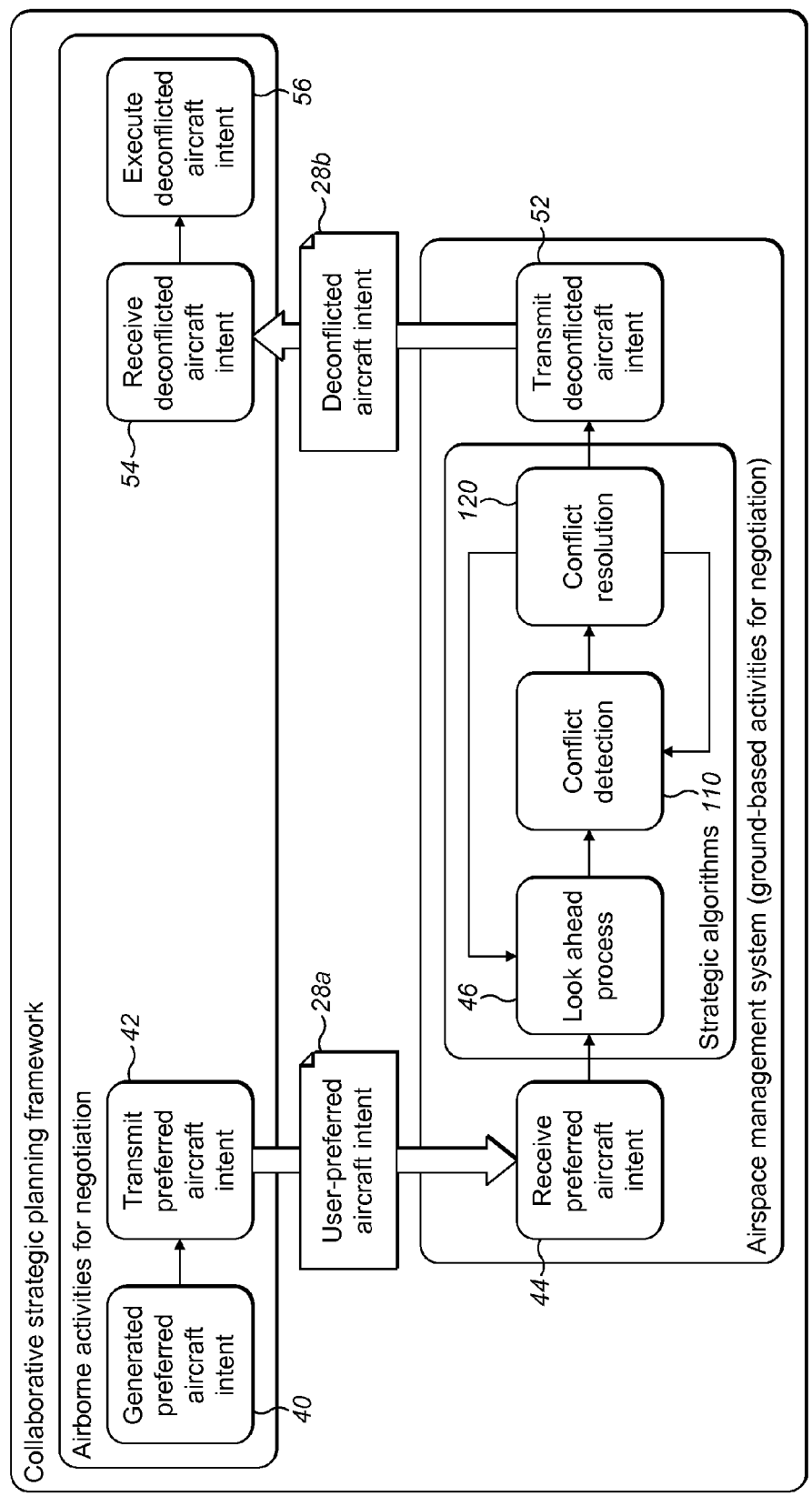
FIG. 3 is a schematic representation of a negotiation process between an aircraft an air traffic management.

The negotiation process 24 defines the type of information to be shared between the airborne automation system 20 and ground-based automation system 22. The negotiation process 24 also defines who is to start communication according to what events, and the sequence of decisions to be followed in order to agree upon a revised aircraft intent 28. FIG. 3 shows the steps of the negotiation process 24, and will now be described in more detail.

In this example, the negotiation process 24 starts on-board the aircraft 16 with the definition of the aircraft's intent that corresponds to a user preferred trajectory. This is shown in FIG. 3 at 40. The aircraft 16 establishes contact with air traffic management 12 and transmits the user preferred trajectory information 42 expressed as the user-preferred aircraft intent data 28a to air traffic management 12.

Once the user-preferred aircraft intent data 28a has been received, the aircraft 16 and air traffic management 12 engage in a one-to-one negotiation process. During the negotiation process 24, the user preferred aircraft intent data 28a submitted by the aircraft 16 is used by the trajectory computation infrastructure 36 to produce the corresponding trajectory. This user preferred trajectory is analyzed by the traffic management logic 34 in order to detect potential conflicts with other aircraft trajectories.

When conflicts are detected, the airborne automation system 20 and the ground-based automation system 22 will follow the predetermined negotiation protocol required by the negotiation process 24 to agree on trajectory modifications to remove the conflict. The negotiation process 24 includes exchange of trajectory information as the aircraft intent data 28 and, as this is a common characteristic to all possible negotiation protocols, it advantageously allows the protocols to be interchangeable.

Once the user-preferred aircraft intent data 28a has been received by air traffic management 12 as shown at 44 in FIG. 3, the negotiation process 24 continues with a look-ahead process at 46. The look-ahead process 46 operates to determine when to launch a conflict detection process 110 and which aircraft (and their trajectories) have to be included in that process. Different look-ahead processes 46 may be implemented as long as pre-established interfaces are maintained.

The look-ahead process 46 may run the conflict detection process 110 periodically. The rate of repetition may be varied, for example according to the volume of air traffic. In addition or as an alternative, the conflict detection process 110 may be invoked whenever a new aircraft enters the managed airspace. Further details are given below.

Once the look-ahead process 46 decides which aircraft 16 are going to be included in the conflict detection process 110, the conflict detection process 110 is launched. Here, as well, different conflict detection processes 110 may be implemented as long as the pre-established interfaces are maintained. In summary, the conflict detection process 110 computes the user preferred trajectories corresponding to the user-preferred aircraft intent data 28a received, and analyses the trajectories computed to identify potential conflicts. When any conflicts are identified by the conflict detection process 110, the conflict resolution process 120 is launched.

The conflict resolution process 120 performs calculations to revise the user preferred aircraft intent data 28a to generate revised aircraft intent data 28b. The revised intents result in corresponding revisions to the user-preferred trajectories in order to remove the identified conflicts. Different conflict detection processes 110 may be implemented as long as the pre-established interfaces are maintained.

As will be explained below, the conflict resolution process 120 calls the conflict detection process 110 to analyse the revised trajectories resulting from the revised aircraft intent data 28b it proposes to ensure that no conflicts remain and that no new conflicts are generated. Once it is confirmed that no conflicts arise, the revised aircraft intent data 28b are transmitted to the affected aircraft 16 by air traffic management 12, as shown at 52 in FIG. 3.

The revised aircraft intent data 28b are received by the aircraft 16 under the current consideration, as shown at 54. The aircraft 16 may generate a corresponding revised trajectory. In some embodiments, the aircraft 16 is obliged to follow the revised trajectory defined by the revised aircraft intent data 28b. In other embodiments, including the embodiment currently being described, the aircraft 16 is given the option of rejecting the revised aircraft intent data 28b. In this case a further round of negotiation is required or, if time does not allow, the aircraft 16 may be commanded to accept the revised trajectory by the ground-based automation system 22. The further round of negotiation may see a new set of revised aircraft intent data 28b sent to the aircraft 16 for review of the corresponding new revised trajectory. If improved aircraft intent data 28b cannot be found, or if computation time for the negotiation process runs out, the ground-based automation system 22 may command the aircraft 16 to follow the original aircraft intent data 28b. In any event, once the revised aircraft intent data 28b is accepted and the corresponding trajectory is executed by the aircraft 16 as shown at 56. As will be appreciated, the conflict detection and resolution process is a dynamic process, and so further changes may be imposed on the trajectory as it is executed by the aircraft 16.

Conflict Detection and Resolution Overview

Methods of detecting and resolving conflicts in predicted aircraft trajectories are now described. These methods ensure that the resolved trajectories do not result in further conflicts downstream, hence avoiding a "domino effect" of conflicting trajectories propagating backwards through the chain of aircraft.

Figure 4:
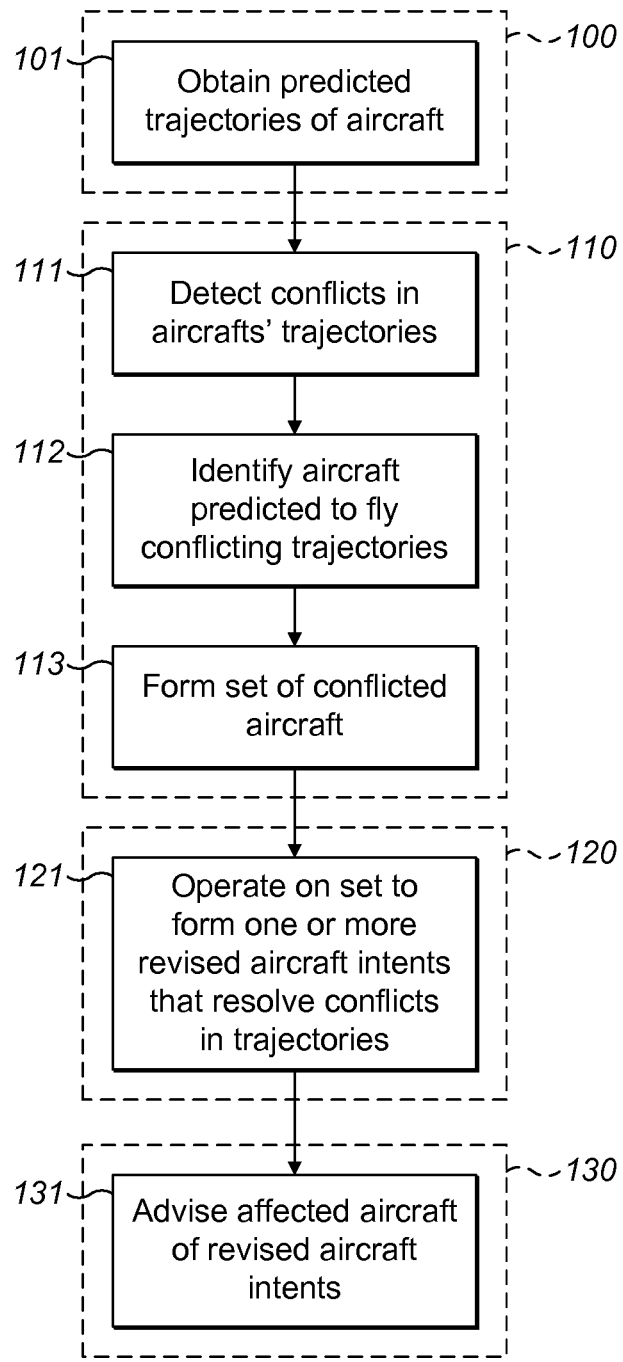
FIG. 4 is a flow chart representation of a method of detecting and resolving conflicts according to an embodiment of the present invention.

The overall conflict detection and resolution process may be envisaged as a two-stage process of firstly detecting conflicts and secondly resolving the conflicts. This is illustrated in FIG. 4 by the dashed boxes 110 and 120. Generally, an initial stage of obtaining user preferred trajectories of aircraft 16 is performed, as shown by dashed box 100 in FIG. 4. Also, a final stage of advising aircraft 16 of revised aircraft intent data 28b is generally performed, as indicated by dashed box 130 in FIG. 4. A more detailed description of the fuller four-stage method of FIG. 4 will now be provided.

The method of FIG. 4 may be practised by a ground-based automation system 22 hosted at an air traffic management facility 12, for example using a network of computers located at the facility 12, as described above. Air traffic management 12 will assume responsibility for the safe passage of aircraft through the airspace 10 that it manages. The method starts at 101 where user preferred trajectories of the aircraft 16 flying through the managed airspace 10 are obtained. This may be done in several different ways. For example, a description of the user preferred trajectories may be provided. Alternatively, the trajectories may be calculated and hence predicted as part of the method. A description of an aircraft's user preferred intent data 28a may be provided, for example expressed using a formal language, as shown at 28 in FIG. 2. Air traffic management 12 may then use this user preferred aircraft intent data 28a to calculate a user preferred trajectory for the aircraft 16.

With the trajectory prediction process 100 complete, the method moves to the conflict detection process 110. At step 111, aircraft trajectories are compared and conflicts identified. This process is described in more detail below. At 112, the aircraft 16 predicted to fly conflicting trajectories are identified and these aircraft are nominally placed into a set of conflicted aircraft at step 113.

The method then progresses to the conflict resolution process 120. At step 121, the set of aircraft formed at step 113 is used. The user preferred aircraft intent data 28a of aircraft identified within the set of conflicted aircraft are adjusted and corresponding revised trajectories calculated to identify one or more instances where all conflicts are resolved.

Once the conflicts are resolved, the method may progress to process 130 where conflicted aircraft 16 are advised of their revised aircraft intent data 28b. This may involve sending a description of the associated aircraft intent such that the aircraft 16 may then calculate the corresponding trajectory or it may involve transmitting a description of the new trajectory to the aircraft 16. The former example was described above. As a description of aircraft intent is by definition a set of instructions that unambiguously define a trajectory, it is assured that the aircraft 16 will generate the intended trajectory.

As will be appreciated, the above method will be performed repeatedly by air traffic management 12. This accounts for variable conditions that may otherwise affect the calculated trajectories. For example, unexpected winds may give rise to conflicts that were not previously predicted. Repetition of the method may also be used to check that aircraft 16 are indeed following the user preferred and revised trajectories and that the airspace remains free of predicted conflicts. Although the rate of repetition may be varied, as an example the method may be repeated at set intervals of every thirty seconds. In addition or as an alternative, the method may be invoked whenever a new aircraft 16 enters the managed airspace 10. As well as including all aircraft 16 within the managed airspace 10, the method may also consider aircraft 16 approaching the airspace 10.

Figure 5:
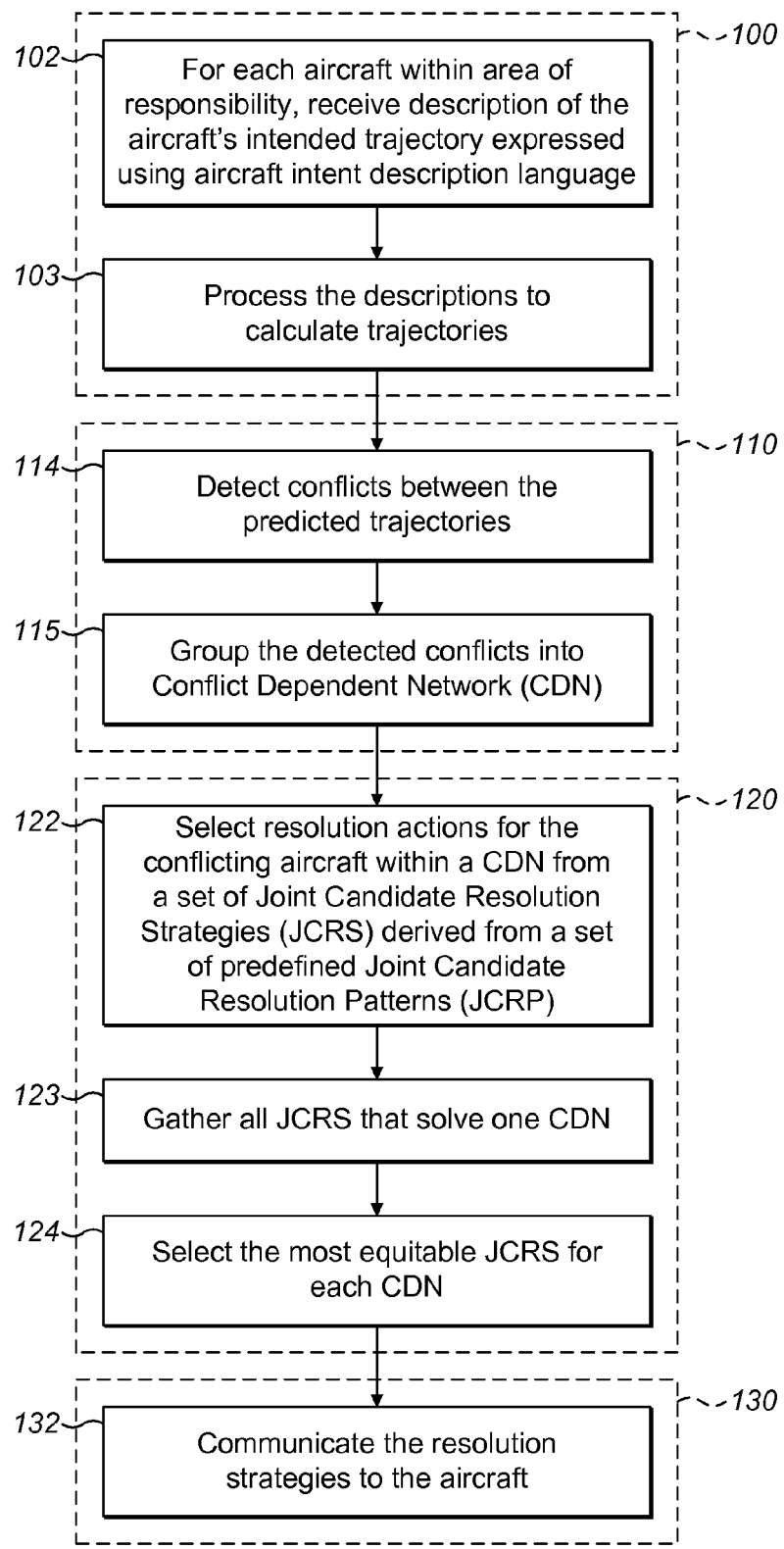
FIG. 5 is a flow chart representation of a method of detecting and resolving conflicts according to another embodiment of the present invention.

FIG. 5 shows another method of managing an airspace 10, including detecting and resolving trajectories of aircraft 16, according to an embodiment of the present invention. According to the embodiment of FIG. 2, the method is integrated in a ground-based automation system 22 and works as follows.

At 102, the traffic management logic 34 of the ground-based automation system 22 receives a description of the user preferred trajectories of the aircraft within its area of responsibility. The trajectories are described by the user preferred aircraft intent data 28a expressed using an aircraft intent description language.

At 103, the traffic management logic 34 sends the user preferred aircraft intent data 28a to the trajectory computation infrastructure 36 that processes those data and predicts the corresponding user preferred trajectories.

At 114, possible conflicts are identified, i.e. instances where the separation between predicted trajectories are in violation of established minimum distances between the aircraft 16.

At 115, the detected conflicts are grouped into conflict dependent networks. Each network includes all aircraft 16 in conflict with at least one other aircraft 16 within the network. For example, if aircraft A1 conflicts with aircraft A2, and aircraft A2 conflicts with aircraft A3 and A4 and aircraft A4 conflicts with aircraft A5, a conflict dependent network is formed containing aircraft A1, A2, A3, A4 and A5. All aircraft 16 within the network have conflict dependencies on the trajectories of all the other aircraft 16 in the network, either directly or indirectly. A consequence of these types of networks is that any particular aircraft 16 can be a member of only one conflict dependent network.

At 120, the conflicts are resolved "network-wise", i.e. considering simultaneously all conflicts in a conflict dependent network. In this way, the implications of the resolution actions on other conflicts within the network are taken into account from the outset. The resolution actions are the actions needed to be taken by an aircraft 16 to avoid the conflict. These actions are designed as amendments to the user-preferred aircraft intent data 28a that produce revised trajectories.

As indicated at 122, the resolution actions for the conflicting aircraft within a conflict dependent network are selected from a set of joint candidate resolution strategies (JCRS). The joint candidate resolution strategies are derived from a set of predefined joint candidate resolution patterns (JCRP). The selection is carried out so that the selected joint candidate resolution strategy belongs to a set of Pareto-optimal joint candidate resolution strategies. This set of joint candidate resolution strategies that solve each conflict dependent network are gathered together at step 123. Pareto optimality in this context may be defined in different ways. For example, it may relate to the changes in flight times, such as spreading evenly delays in flight times. In this particular embodiment, Pareto optimality relates to a joint cost function capturing the additional operating costs resulting from the resolution actions as applied across all the aircraft 16 in the conflict dependent network. Thus, the resolution actions in the selected joint candidate resolution strategy are such that the aircraft 16 belonging to the same conflict dependent network share equitably or fairly the additional costs incurred as a result of the trajectory modifications required to resolve the conflicts. A particular consideration of how fairness may be implemented in a conflict resolution process 120 is described in detail below. At step 124, the most equitable or fair joint candidate resolution strategy is selected for each conflict dependent network.

Once the most equitable or fair joint candidate resolution strategy has been selected, the aircraft 16 whose trajectories have been amended are identified and the revised aircraft intent data 28b are communicated to the affected aircraft 16, as indicated at 132.

In this way, it is possible to solve the problem of resolving air traffic conflicts strategically in a trajectory-based operational environment by taking into account the equitable/fair distribution of the costs incurred in the resolution of the conflicts among all aircraft involved. In particular, regard may be had to time and fuel consumption related costs, as is explained below.

Figure 6:
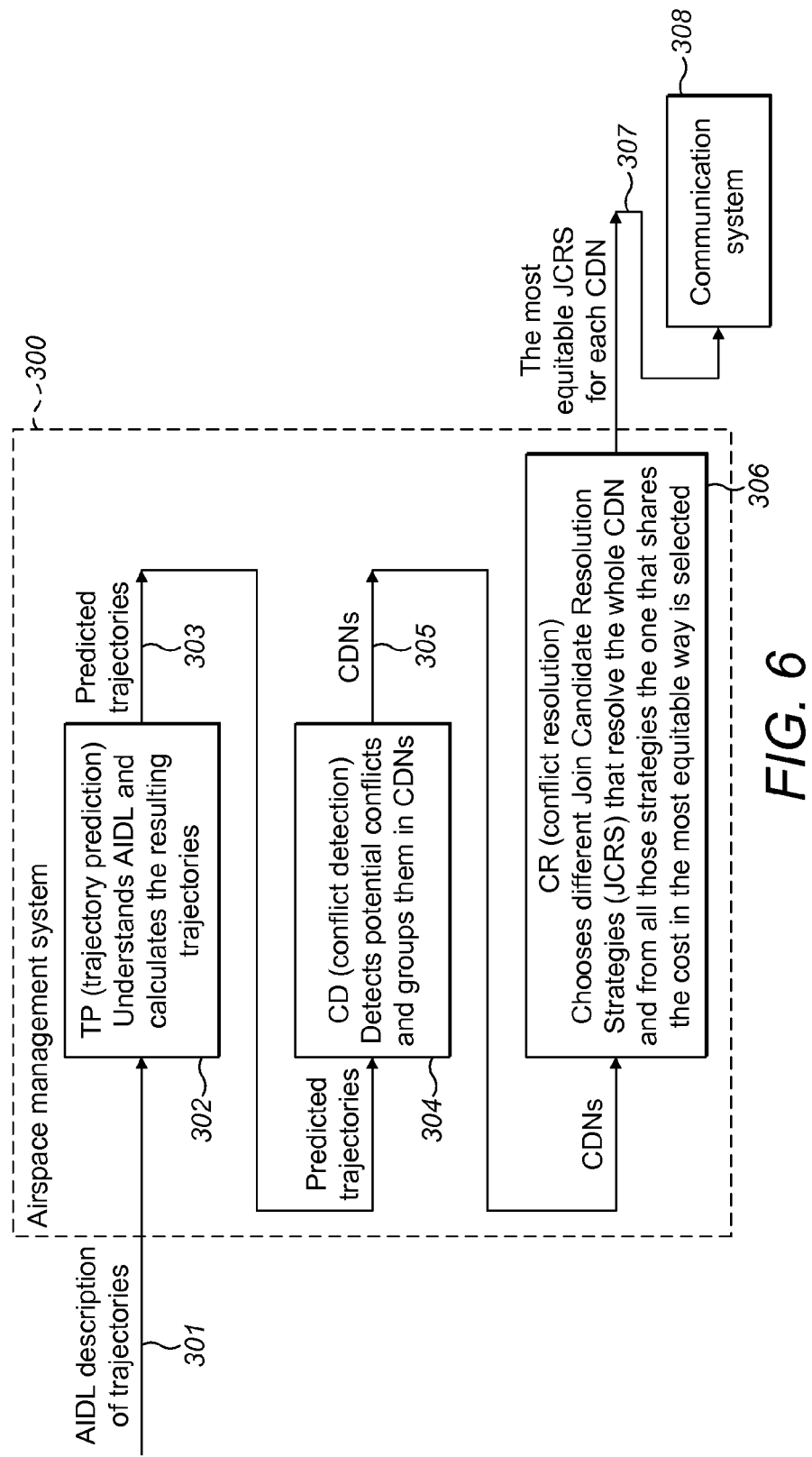
FIG. 6 is a flow chart representation of a system for detecting and resolving conflicts according to an embodiment of the present invention.

FIG. 6 shows a further embodiment of a ground-based automation system 300, that may be used to implement the method of FIG. 4 or FIG. 5. The ground-based automation system 300 comprises three sub-systems, namely a trajectory prediction module 302, a conflict detection module 304 and a conflict resolution module 306.

The ground-based automation system 300 receives as an input a description of the trajectories of the aircraft expressed as user preferred aircraft intent data 28a using an aircraft intent description language (AIDL), as indicated at 301.

The trajectory prediction module 302 calculates the user preferred trajectories and provides them as output 303. The user preferred trajectories 303 are taken as an input by the conflict detection module 304.

The conflict detection module 304 uses the user preferred trajectories to detect conflicts and to group the conflicts into conflict dependent networks, as has been described above. The conflict detection module 304 provides the conflict dependent networks as an output 305 that is provided to the conflict resolution module 306.

The conflict resolution module 306 operates on the conflict dependent networks to produce joint candidate resolution strategies for each conflict dependent network, and outputs the most equitable or fair joint candidate resolution strategy at 307. The most equitable or fair joint candidate resolution strategy is used to determine the data to be sent to affected aircraft by a communication system 308. Although the communication system 308 is shown as being separate to the ground-based automation system 300, it may be a part of the ground-based automation system 300. For example, the modules 302, 304 and 306 and, optionally, the communication system 308 may be provided as a computer system. The computer system may comprise a single server, a plurality of servers and may be provided at a single location or as part of a distributed network.

As noted above, the two key processes in the method are the conflict detection process 110 and the conflict resolution process 120. Each of these processes will now be described in more detail.

Conflict Detection

Figure 7:
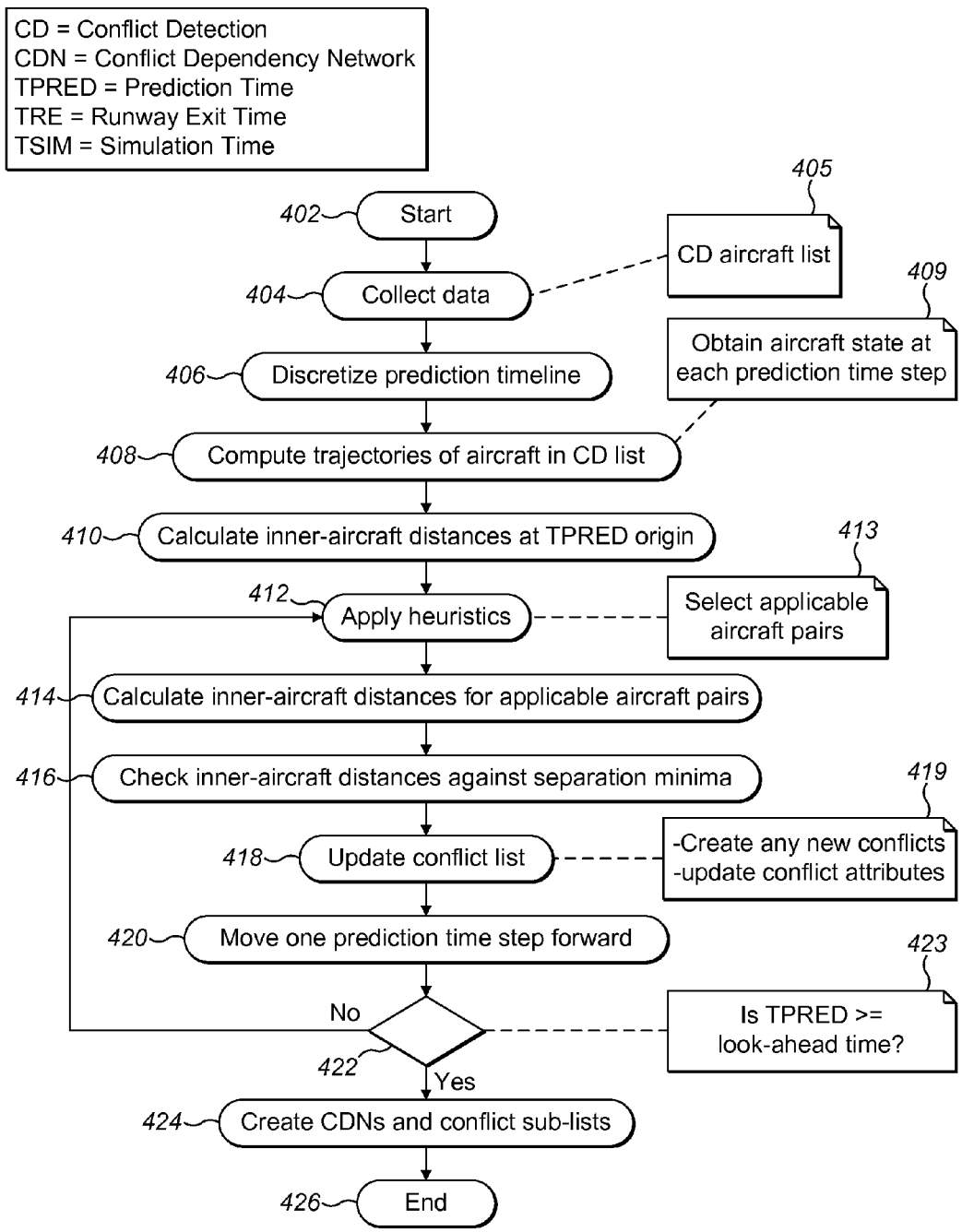
FIG. 7 is a flow chart representation of a conflict detection process.

FIG. 7 shows the steps involved in a preferred form of the conflict detection process 110. FIG. 7 shows the process 110 starting at 402. At step 404, data is collected. Specifically, a conflict detection (CD) list of aircraft 405 is compiled. The aircraft list 405 to be considered by the conflict detection process is the list of aircraft 405 known at the time when the conflict detection and resolution processes are launched.

Each aircraft 16 in the aircraft list 405 must have associated certain pieces of information that are required to carry out the conflict detection process 110. These pieces of information are referred to as conflict detection attributes, and are initially provided together with the aircraft list 405. The conflict resolution process 120 may in turn alter the conflict detection attributes when subsequently calling the conflict detection process 110 in order to verify whether the revised aircraft intent data 28b and the corresponding revised trajectories are indeed conflict free. The main conflict detection attributes are described below.

Type: each aircraft 16 in the list 405 is marked as either available or unavailable, referred to as "unlocked" and "locked" hereinafter. An aircraft 16 has a preferred trajectory that it would like to fly. That trajectory is expressed as the aircraft intent or, in other words, how the aircraft would like to fly that trajectory. If that intention to fly can still be changed, this means the aircraft 16 and air traffic management 12 have not yet agreed to it, in which case the aircraft is available or unlocked. If it cannot be changed, the aircraft 16 is unavailable or locked.

Initial conditions: the available aircraft 16 have associated an estimated time and aircraft state at sector entry (i.e. at the time of entering the managed airspace 10). These data represent the predicted initial conditions of the aircraft 16 at sector entry and these conditions are the starting point for the predictions and search for conflicts.

Current aircraft intent: the current aircraft intent of an unlocked aircraft may be that aircraft's user preferred aircraft intent 28a, or a revised aircraft intent 28b resulting from a previous conflict detection and resolution process.

At 406, the timeline of the current conflict detection and resolution process is discretized.

Next, at 408, the conflict detection process 110 calls a trajectory predictor (TP) of the trajectory computation infrastructure 36 to predict the trajectories within its sector for all the aircraft 16 in the aircraft list 405 from the current simulation time forward. The inputs to the trajectory computation process are the initial conditions and the current aircraft intent 28 provided as the aircraft's conflict detection attributes. This provides the aircraft state at each prediction time step for all aircraft 16, as indicated at 409.

Once the trajectory predictions are available, the conflict detection process 110 starts calculating the evolution of the inter-aircraft distances for all possible aircraft pairs along the prediction timeline. In this embodiment, the term inter-aircraft distance refers to the shortest distance over the Earth's surface between the ground projections of the position of two aircraft 16. Inter-aircraft distance is used because it is assumed that aircraft 16 must maintain horizontal separation at all times and that, consequently, the separation minima applicable are expressed in terms of inter-aircraft distance, e.g. radar separation or wake vortex separation. Thus, a conflict occurs when the predicted inter-aircraft distance between two aircraft 16 falls below the applicable minimum during a certain time interval. The conflict detection process 110 has access to a database containing the applicable minima, which are inter-aircraft distance values that must not be violated. These minima may depend on the aircraft type, and the relative position of the aircraft 16 (e.g. wake vortex separation may prevail between aircraft 16 following the same track, but not between aircraft 16 on converging tracks). During this process, regard may be paid to the vertical separation of aircraft 16, e.g. to allow reduced horizontal separation where the vertical separation is sufficient to allow this.

The conflict detection process 110 starts at step 410 where the inter-aircraft distances are calculated for the initial conditions, i.e. the origin of the timeline. Next, at step 412, all possible pairs of aircraft 16 are formed as shown at 413, and heuristics are applied to each pair of aircraft 16. At each time step, the conflict detection process 110 applies some heuristics before calculating the inter-aircraft distances, in order to skip aircraft pairs that, given the prior evolution of their inter-aircraft distance and their relative positions, cannot possibly enter into a conflict during the current time step. In addition, other heuristics will be in place to accelerate the calculation of the inter-aircraft distances and the comparison with the applicable minima.

Once the heuristics have been applied, the remaining aircraft pairs have their inter-aircraft distances calculated at 414. These inter-aircraft distances are checked against the applicable separation minima at 416. At 418, the list of conflicts is updated with the newly identified conflicts. This step includes creating the new conflicts in the list and updating associated attributes, as shown at 419.

Once step 418 is complete, the conflict detection process 110 can proceed to the next time step, as shown at 420. A check is made at step 422 to ensure that the next time step is not outside the prediction window as indicated at 423 (i.e. the conflict detection process will look forward over a certain time window, and the time steps should move forward to cover the entire window, but should not go beyond the window). Provided another time step is required, the conflict detection process 110 loops back to step 412 where heuristics are applied for the next time step.

In this way, the conflict detection process 110 proceeds along the prediction time line, from the start to the end of the prediction window, calculating the inter-aircraft distance between all possible aircraft pairs at each time step. The conflict detection process 110 is able to identify all conflicts between the aircraft 16 in the aircraft list 405 between the start and end of the prediction timeline. The conflict detection process 110 compiles the identified conflicts into a conflict list, where each conflict is associated with the following pieces of information, denoted as conflict attributes.

Conflicting aircraft pair: identifiers of the two conflicting aircraft 16, together with their conflict detection attributes.

Figure 8A:
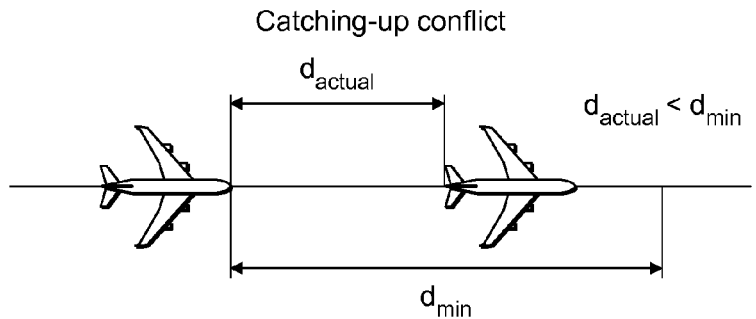
FIGS. 8a and 8b show two examples of conflicting trajectories.
Figure 8B:
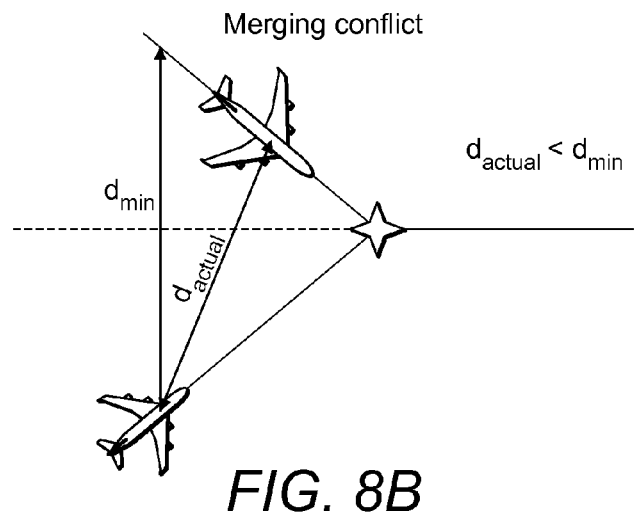

Conflict type: an identifier associated to the type of conflict. In this particular embodiment, only two types of conflicts can occur. The first type, catching-up conflicts, is shown in FIG. 8*a* where the loss of separation occurs between aircraft 16 flying along the same track, i.e. their separation dactual falls below the minimum separation allowed dmin. The second type, merging conflicts, is shown in FIG. 8*b* where the loss of separation takes place between two aircraft 16 on converging tracks as they approach the merging point, i.e. their separation dactual falls below the minimum separation allowed dmin.

Conflict interval: the time interval, in the prediction timeline, during which the inter-aircraft distance is below the applicable minimum.

Conflict duration: the length, in time steps, of conflict interval, i.e. the number of times steps during which the inter-aircraft distance is below the applicable minimum.

Conflict intensity: this attribute is a value between 0 and 10 that provides a measure of the severity of the conflict (with 0 being the lowest level of severity and 10 the highest). The conflict intensity is a function of the minimum predicted inter-aircraft distance during the conflict and is calculated taking into account the proportion of the applicable minimum violated by that minimum distance. For example, a minimum predicted separation of 2 miles will result in a conflict intensity of 4.0 when the applicable minimum is 5 miles, and 6.7 when the applicable minimum is 3 miles.

Aircraft intent instructions associated with the conflict: the conflict detection process 110 associates the set of aircraft intent instructions that are active for each of the two conflicting aircraft during the conflict interval.

Subsequently, at 424, the identified conflicts are grouped into conflict dependent networks according to an equivalence relation (called the conflict dependency relation) that is defined over the set of conflicting aircraft 16. This equivalence relation is in turn based on another relation defined over the set of conflicting aircraft 16, namely the conflict relation ('A belongs to the same conflicting pair as B'), which establishes that an aircraft A1 is related to an aircraft A2 if they are in conflict with each other (or they are the same aircraft). The conflict relation is not an equivalence relation, as it does not have the transitive property (if A1 is in conflict with A2 and A2 is in conflict with A3, A1 is not necessarily in conflict with A3). The conflict dependency relation is based on the conflict relation as follows: two aircraft 16 are considered related (equivalent) according to the conflict dependency relation if it is possible to connect them by means of a succession of conflict relations. It is easy to check that this relation fulfils the three properties of equivalence: reflexive, symmetric and transitive.

As an example, let us consider an aircraft A1 anticipated to enter in conflict with two different aircraft, A2 and A3, during a certain segment of its trajectory. In addition, let us assume that A3 will also come in conflict with another aircraft, A4. As a result, the following conflicts (conflict relations) will take place: A1-A2, A1-A3 and A3-A4. From these conflict relations it can immediately be seen that A1 is equivalent to A2 and to A3 and that A3 is equivalent to A4. In addition, by the transitive property A2 is equivalent to A3 (applying the conflict dependency relation: A2 is in conflict with A1, which is in conflict with A3), A1 is equivalent to A4 (applying the conflict dependency relation: A1 is in conflict with A3, which is in conflict with A4) and A2 is equivalent to A4 (applying the conflict dependency relation: A2 is in conflict with A1, which is in conflict with A3, which is in conflict with A4). Thus, the four aircraft 16 belong to the same equivalence class. The elements of an equivalence class are equivalent, under the equivalence relation, to all the others elements of the same equivalence class. Any two different equivalence classes in a non-empty set are disjoint and the union over all of the equivalence classes is the given set.

In the present context, the equivalence classes defined by the conflict dependency equivalence relation are the conflict dependency networks mentioned previously. It will now be understood that the aircraft 16 belonging to each conflict dependent network are interconnected through conflict dependency relations. Considering the properties of equivalence relations, conflict dependent networks are disjoint, i.e. two aircraft 16 cannot belong to two conflict dependent networks simultaneously. In the example above, A1, A2, A3 and A4 form a conflict dependent network.

Considering the above, the conflict detection process 110 first groups the conflicting aircraft 16 into conflict dependent networks at 424 (using the information in the conflict list), and then groups the conflicts between the aircraft 16 in each conflict dependent network into a conflict sub-list. The conflict list contains as many sub-lists as there are conflict dependent networks. Analogously to the conflict dependent networks, conflict sub-lists are disjoint and their union is the conflict list. Finally, the conflict detection process 110 orders the conflicts in each sub-list chronologically (earlier conflicts first) based on the first time step at which the applicable minimum is first violated (the start of the conflict interval).

Conflict Resolution

Completion of the conflict detection process 110 causes the conflict resolution process 120 to be called. The conflict detection process 110 provides the conflict resolution process 120 with the conflict list organized as a set of conflict sub-lists, each corresponding to a conflict dependent network.

The conflict resolution process 120 modifies the current aircraft intent data 28 of at least some of the conflicting aircraft 16 so that the resulting trajectories are predicted to remain conflict-free and as efficient as possible. The conflict resolution process 120 only alters the aircraft intent data 28 of the unlocked aircraft 16 in the conflict list. Thus, it is assumed that there can be no conflicts involving only locked aircraft (these conflicts would have been resolved in a previous iteration of the conflict detection and resolution processes).

The conflict resolution process 120, for example in the case of arrival management, may measure efficiency on the basis of predicted Runway Threshold Crossing Time (tRT) and fuel consumption for the aircraft 16. In particular, the objective of the conflict resolution process 120 is to alter the aircraft intent data 28 in such a way that the resulting estimated values of tRT and fuel consumption deviate the least possible from the values that would be obtained with the user preferred aircraft intent data 28a. The latter set of values are the ones preferred by the operator, as they result from implementing the operator-preferred strategy (the preferred aircraft intent) and are a reflection of the relative weight placed by the operator on fuel and time costs.

The conflict resolution process 120 operates in a network-wise manner, attempting to get the aircraft 16 belonging to the same conflict dependent network to share equally the costs incurred in resolving the conflicts in which they are involved.

Let us assume that the conflict detection aircraft list 405 contains n aircraft grouped into m disjoint conflict dependent networks. Let us now consider the conflict dependency network $CDN_j = \{A_1^j, \ldots, A_i^j, \ldots, A_{n_j}^j\}$, with $i \in \{1, \ldots, n_j\}$, $j \in \{1, \ldots, m_j\}$ and $$\sum_j n_j = n.$$

All the conflicts in which an aircraft $A_j^i \in CDN_j$ is involved are contained in the conflict sub-list associated to CDNj, denoted as SLj. A Candidate Resolution Strategy (CRS) for an aircraft $A_i^j \in CDN$ is an instance of aircraft intent that, if implemented by $A_i^j$ potentially result in a conflict-free trajectory for the aircraft 16. In principle, any feasible aircraft intent for $A_i^j$ that is operationally meaningful in the scenario considered could be considered a candidate resolution strategy for that aircraft 16 (including its preferred aircraft intent) since a conflict may be resolved as a result of actions. Candidate resolution strategies are derived from a set of pre-defined candidate resolution patterns (CRPs), which capture the allowable degrees of freedom that the aircraft 16 have at its disposal to resolve conflicts in the scenario considered. Different CRPs target different conflict problems, for example some assist in an aircraft catching up and coming into conflict with an earlier aircraft and some assist in an aircraft falling behind into conflict with a following aircraft. Selection of appropriate CRPs may be made, as is described in more detail below.

A joint candidate resolution strategy (JCRS) for CDNj is a set comprising of nj candidate resolution strategies, each assigned to one of the aircraft in $CDN_j$: $JCRS_j = \{CRS_1^j, \ldots, CRS_i^j, \ldots, CRS_{n_j}^j\}$, with JCRSj denoting a JCRS for CDNj and $CRS_i^j$ denoting a candidate resolution strategy for the aircraft $A_i^j \in CDN_j$. A conflict-free JCRSj is a joint candidate resolution strategy for CDNj that is predicted to result in no conflicts involving the aircraft 16 in CDNj, i.e. SLj would become empty as a result of implementing a conflict-free JCRSj. To check whether a JCRSj is conflict-free, the conflict resolution process 120 must call the conflict detection process 110.

The objective of the conflict resolution process 120 is to design a conflict-free JCRSj that distributes the cost of resolving the conflicts in SLj among the aircraft belonging to CDNj in the most equitable or fair way possible.

It is assumed that the cost incurred by an aircraft $A_i^j$ a result of implementing a strategy $CRS_i^j$ is measured by the deviation that $CRS_i^j$ causes from the aircraft operator's objectives (for the whole trajectory or a segment). These objectives are captured by the time and fuel consumption corresponding to the trajectory that results from flying according to the user preferred aircraft intent and that are denoted, respectively, as $t_{RT}^{pref}$ and Fpref. Thus, the cost of a candidate resolution strategy $CRS_i^j$ for $A_i^j$ is defined as follows:

$$c(CRS_i^j = w_T(A_i^j)|t_{RT}(CRS_i^j) - t_{RT}^{pref}| + w_F(A_i^j)(F(CRS_i^j) - F^{pref}) \quad (1)$$

where $c(CRS_i^j)$ is the cost of $CRS_i^j$, $t_{RT}(CRS_i^j)$ is the arrival time for aircraft $A_i^j$ that is expected to result from flying $CRS_i^j$, $F(CRS_i^j)$ is the expected amount of fuel consumed by aircraft $A_i^j$ as a result of flying $CRS_i^j$, and $w_T(A_i^j)$ and $w_F(A_i^j)$ are scaling weights. These weights may depend on $A_i^j$ to capture the operator preferences on the relative importance of time and fuel costs. Default values of $w_T(A_i^j)$ and $w_F(A_i^j)$ valid for all aircraft 16 will be available. In this embodiment, these default values, denoted as wT and wF, will capture a default situation where equal relative importance is assigned to fuel and time costs. When the values of the weights are changed to encode an operator preference other than the default one, it must be ensured that $$w_T(A_i^j) + w_F(A_i^j) = w_T + w_F = W \quad (2)$$

where W is a constant, so that the values of the cost are comparable across aircraft 16. For example, if the weights were such that $w_T(A_i^j) > w_T$ and $w_F(A_i^j) > w_F$, with $w_T(A_i^j) + w_F(A_i^j) = W$, it would mean the operator of $A_i^j$ prefers to meet its arrival time at the expense of using extra fuel, i.e. it considers time costs more important than fuel costs.

As it stems from equation (1), the cost of delay and early arrival are considered to be the same. Thus, it is implicitly assumed that it is as costly for the airline to arrive early as to arrive late. The cost function could be adjusted to encode a higher cost of delay versus early arrival. For example, removing the absolute value from $|t_{RT}(CRS_i^j) - t_{RT}^{pref}|$ in (1) would result in early arrivals having a negative cost, which would capture a situation where the airline considers rewarding an early arrival.

Considering the above, the cost of a CRS measures the difference between the arrival time and fuel consumption (the two key variables defining operational costs, especially in arrival management operations) that would result from flying the candidate resolution strategy and those that would result from flying the user preferred aircraft intent 28a, with the latter being the values preferred by the operator. Thus, the cost of implementing the user preferred aircraft intent 28a as a CRS is zero, as it would result in no deviations from the preferred arrival time and fuel consumption.

In light of the above, the resolution of the conflicts in certain conflict sub-lists is cast as a constrained multi-objective optimization problem over the corresponding conflict dependent network. The problem is stated as follows:

minimise $c(JCRS_j)=(c(CRS_1^j), \ldots, c(CRS_i^j), \ldots, c(CRS_{n_j}^j))$ subject to $JCRS_j \in D_j, D \subset X_j$ (3)

where $c(JCRS_j)$ is a vector function, with image in $R^{n_j}$ fined over the set Xj, which is the set of all possible joint candidate resolution strategies for SLj. A vector $c(JCRS_j)$ includes the costs derived from each of the candidate resolution strategies contained in JCRSj, a joint candidate resolution strategy for the aircraft 16 in CDNj. Dj denotes the set of conflict-free joint candidate resolution strategies for those aircraft 16. The solution to the problem in (3) would be one (or more) $JCRS_j \in D_j$ simultaneously minimize, in some appropriate sense, the resolution costs as defined in (1) for all the aircraft 16 in the network.

It is not possible to define a single global optimum for a problem such as the one in (3). Instead, as it is commonly done in multi-objective optimization problems, we will assume that the solution consists of a set of acceptable trade-offs among the costs incurred by the aircraft 16. The set of trade-offs considered is the Pareto set, which comprises of all the Pareto-optimal solutions. A Pareto-optimal solution of (3) is a conflict-free JCRSj that is optimal in the sense that no other conflict-free JCRSj can reduce the cost for an aircraft 16 in CDNj without increasing the cost for at least one other aircraft 16. To characterize mathematically the Pareto set, it is necessary to extend the relational operators =, ≤ and < to the set $Z_j = \text{Im}(c(D_j))$, which is the image of Dj on $R^{n_j}$, i.e. $Z_j \subseteq R^{n_j}$. Thus, $c(JCRS_j) \in Z_j \subseteq R^{n_j}$. For any two vectors $u, v \in Z_j$, the following relationships are defined:

$u = v$ if $\forall i \in \{1, \ldots, n_j\} : u_i = v_i$ $u \leq v$ if $\forall i \in \{1, \ldots, n_j\} : u_i \leq v_i$ $u < v$ if $u \leq v$ and $u \neq v$ (4)

Considering the definitions in (4), a conflict-free joint candidate resolution strategy $JCRS_j^*$ is said to be a Pareto-optimal solution to the problem (3) if there is no $JCRS_j \in D$ such that $c(JCRS_j) < c(JCRS_j^*)$ (5)

The individual candidate resolution strategies that make up a Pareto-optimal solution are denoted as $CRS_1^{j*}, \ldots, CRS_i^{j*}, \ldots, CRS_{n_j}^{j*}$. Considering the individual costs in $c(JCRS_j^*)$, given by $c_1(JCRS_j^*) = c(CRS_1^{j*}), \ldots,$ $c_i(JCRS_j^*) = c(CRS_i^{j*}), \ldots, c_{n_j}(JCRS_j^*) = c(CRS_{n_j}^{j*})$, there is no $JCRS_j \in D_j$ that can cause a reduction in one of these costs without simultaneously causing an increase in at least one of the others. As said above, the Pareto set of the problem (3), denoted as Pj, contains all the conflict-free joint candidate resolution strategies for CDNj that fulfil (5).

The conflict resolution process 120 proposes to resolve the conflicts in SLj by means of a $JCRS_j^*$ selected from the Pareto set, Pj. To that aim, the conflict resolution process 120 must first search for Pareto-optimal solutions from which to choose. In other words, the conflict resolution process 120 must build a suitable subset of the Pareto set. Once an appropriate number of conflict-free, Pareto-optimal joint candidate resolution strategies have been found, the conflict resolution process 120 selects the one consider equitable according to axiomatic bargaining principles. Axiomatic bargaining is a field of game theory that provides axioms on how to select solutions with certain properties, such as equity, to a game. In the present context, we can consider the selection of the equitable JCRSj as a game involving the aircraft in CDNj. It is clear that an equitable solution to the game should be Pareto-optimal, $JCRS_j^*$, as a strategy that is not Pareto-optimal will not be unanimously preferred by all players (it will not be equitable to some players). However, Pareto-optimality alone is not sufficient, as some Pareto-optimal solutions may be considered more equitable than others. For example, some Pareto-optimal $JCRS_j^*$ may result in very high costs for some aircraft and very low costs for some other aircraft, while other Pareto-optimal $JCRS_j^*$ may distribute the costs among the aircraft 16 more equitably. Axiomatic bargaining principles will be used to guide the selection of the most equitable $JCRS_j^*$ among those found, with equity in this context reflecting equality in cost distribution.

The selected most-equitable Pareto-optimal strategy is the one proposed to resolve the conflicts in SLj.

The mathematical method adopted to generate Pareto-optimal solutions to (3) is the linear weighting method, which consists of converting the multi-objective optimization problem into a single-objective one where the function to be minimized is a linear combination of the costs $c(CRS_1^j), \ldots, c(CRS_i^j), \ldots, c(CRS_{n_j}^j)$. The resulting single-objective minimization problem is stated as follows:

minimise $w(JCRS_j) = w_1 c_1(JCRS_j) + \ldots +$
$w_i c_i(JCRS_j) + \ldots + w_{n_j} c_{n_j}(JCRS_j) = w_1$
$c(CRS_1^j) + \ldots + w_i c(CRS_i^j) + \ldots + w_{n_j} c(CRS_{n_j}^j)$ subject to $JCRS_j \in D_j, D_j \subset X_j$ (6)

The factors wi, with $i \in \{1, \ldots, n_j\}$, are called weights and are assumed to be positive and normalized so that $$\sum_i w_i = 1.$$

Given a combination of values for the weights that comply with the above conditions, the solution of the resulting single-objective minimization problem (6) is a Pareto-optimal solution of the multi-objective minimization problem (3).

The problem of searching for an element of the Pareto set of (3) has been recast as a constrained linear programming problem, which consists of finding the global minimum of a single-objective constrained minimization problem where the objective function is a linear function of the costs associated to the individual candidate resolution strategies in a joint candidate resolution strategy.

The generation of candidate resolution strategies is at the core of the conflict resolution process 120. As mentioned above, the final aim of the conflict resolution process 120 is to find, for each conflicting aircraft 16, a candidate resolution strategy (i.e. an allowable instance of aircraft intent) whose corresponding predicted trajectory is feasible and conflict-free and results in an equitable share of the resolution costs for the operator. It has been seen that the search for an equitable, conflict-free joint candidate resolution strategy for a conflict dependent network is based on minimizing a function of the costs associated to the individual candidate resolution strategies in the joint candidate resolution strategy. Thus, the generation of candidate resolution strategies is at the core of the conflict resolution process 120.

The candidate resolution patterns (CRPs) mentioned above are parameterized instructions used as a template to generate different instructions of the same type. The amended instructions would result in a new trajectory that could resolve the conflicts in which the aircraft 16 is involved. Examples of instructions that will be used to build simple candidate resolution patterns are:

Speed reduction: a sequence of instructions that result in a reduced aircraft speed. A speed reduction may be used to create a delay required to avoid coming into conflict with a preceding aircraft.

Speed increase: a sequence of instructions that result in an increased aircraft speed. A speed increase may be used to gain time required to avoid coming into conflict with a following aircraft.

Altitude change: a sequence of instructions that result in an altitude change.

Figure 9A:
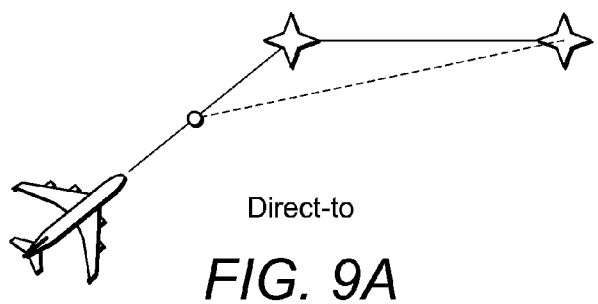
FIGS. 9a and 9b show two examples of how trajectories may be modified to resolve conflicts.

Direct-to: a sequence of lateral instructions that result in a new RNAV horizontal track where the aircraft 16 skips waypoints of the original procedure (it flies direct to a downstream waypoint). A direct-to may be used to gain time or to avoid an area of conflict (see FIG. 9a).

Figure 9B:
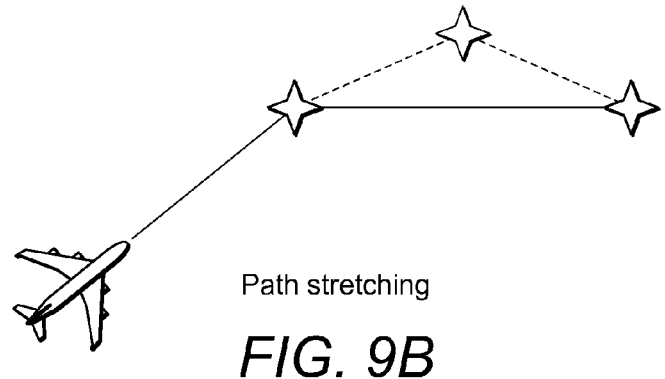

Path stretching: a sequence of lateral instructions that result in a new RNAV horizontal track where waypoints are added to the original procedure. Path stretching may be used to create a delay or to avoid an area of conflict (see FIG. 9b).

When revising aircraft intent data 28 to remove a conflict, the nature of the conflict for the aircraft 16 currently being considered is determined. For example, whether the conflict arises because the current aircraft 16 is catching up with the preceding aircraft 16 may be determined. If so, CRPs that create a delay may be selected. Alternatively, if the conflict arises because the current aircraft 16 is falling behind and coming into conflict with a following aircraft 16, CRPs that give rise to gains in time may be selected. As a further alternative, conflicts arising from paths that cross rather than converge may see CRPs including an altitude change selected.

Once a CRP is selected, random changes to parameters of the aircraft intent 28 may be made, optionally within limits, to generate the candidate resolution strategies. For example, random altitude changes may be used, or random speed changes may be used. The candidate resolution strategies generated in this way for each aircraft 16 may be grouped into joint candidate resolution strategies and the best joint candidate resolution strategies may be selected, as described above.

Figure 10:
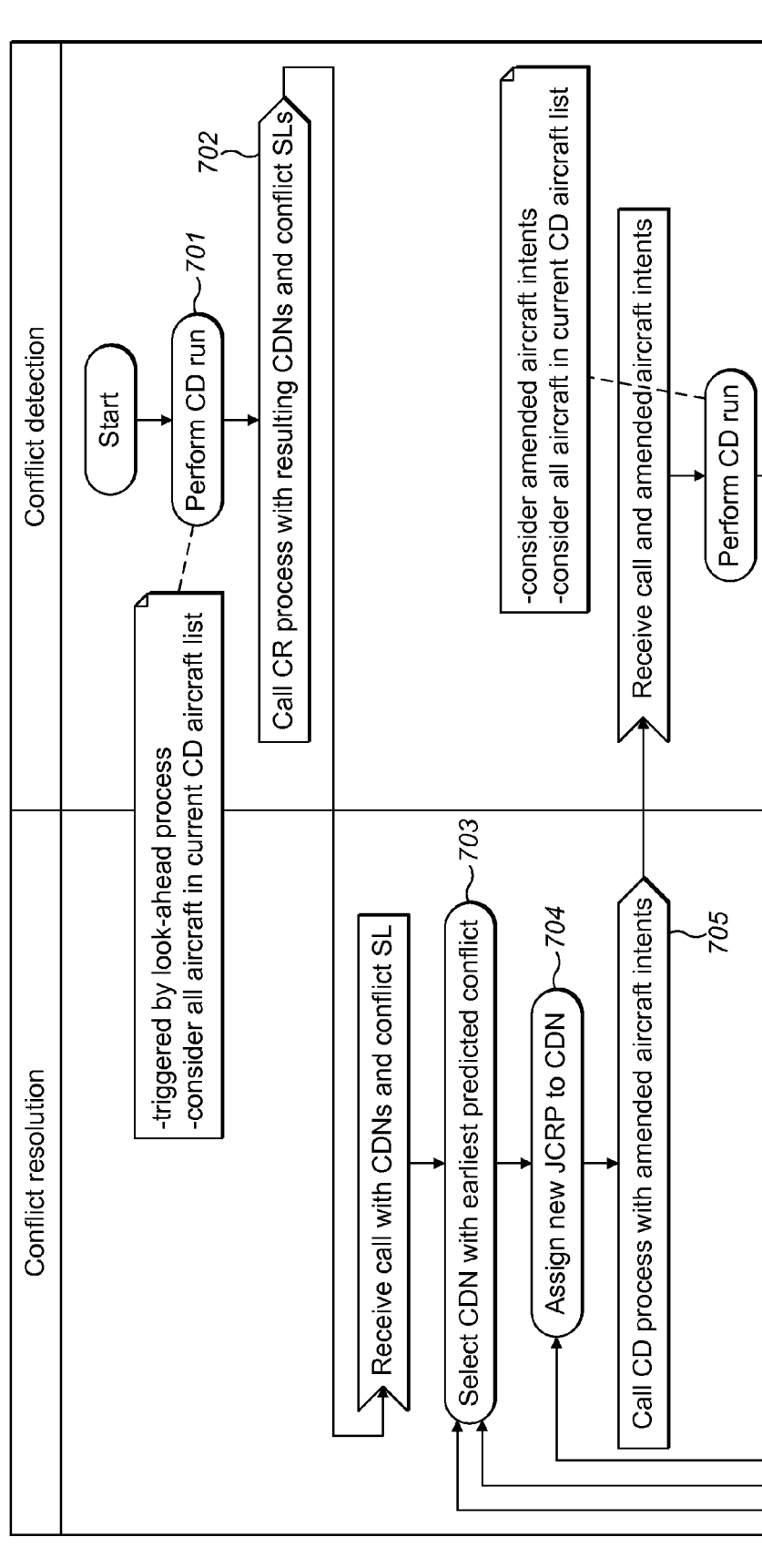
FIG. 10 is a flow chart representation of a conflict resolution process.
Figure 10:
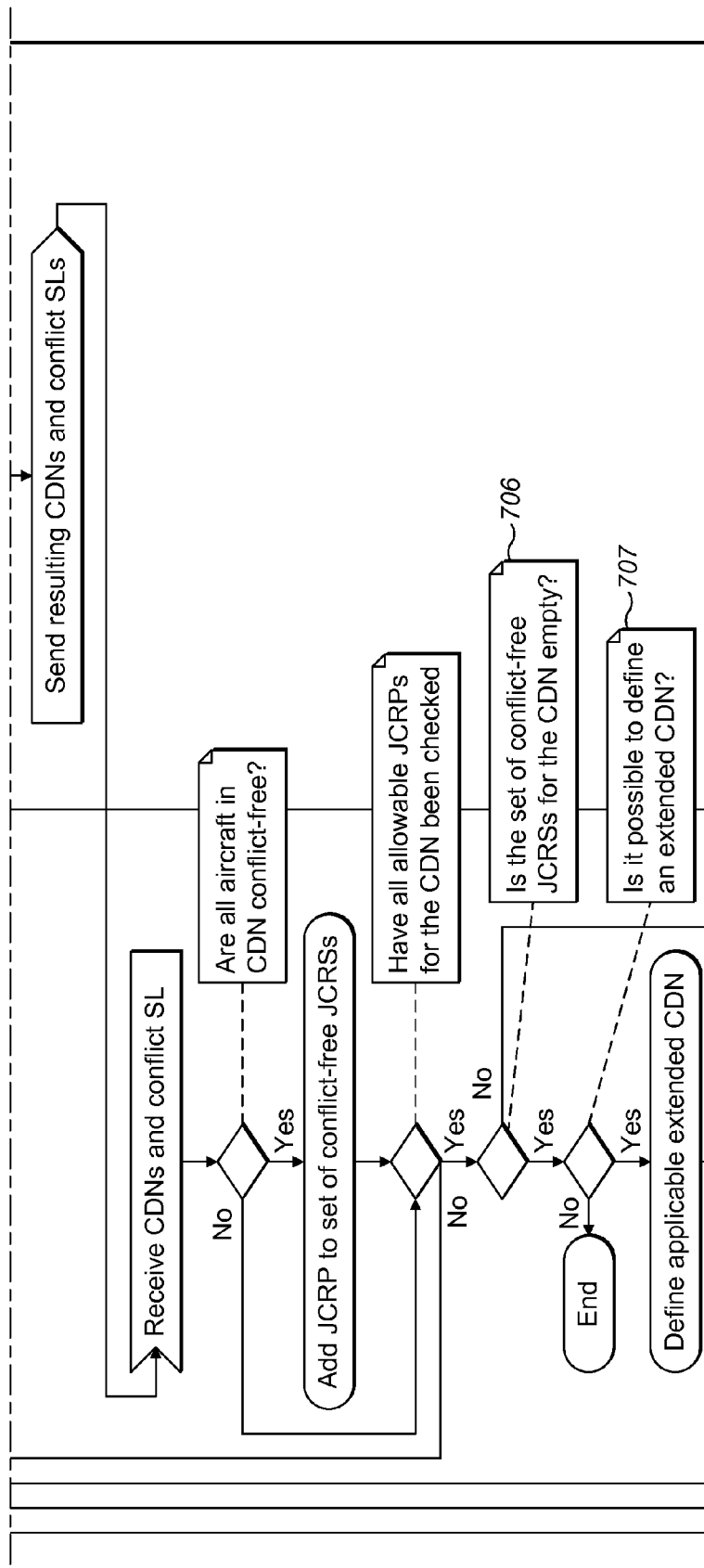
Figure 10:
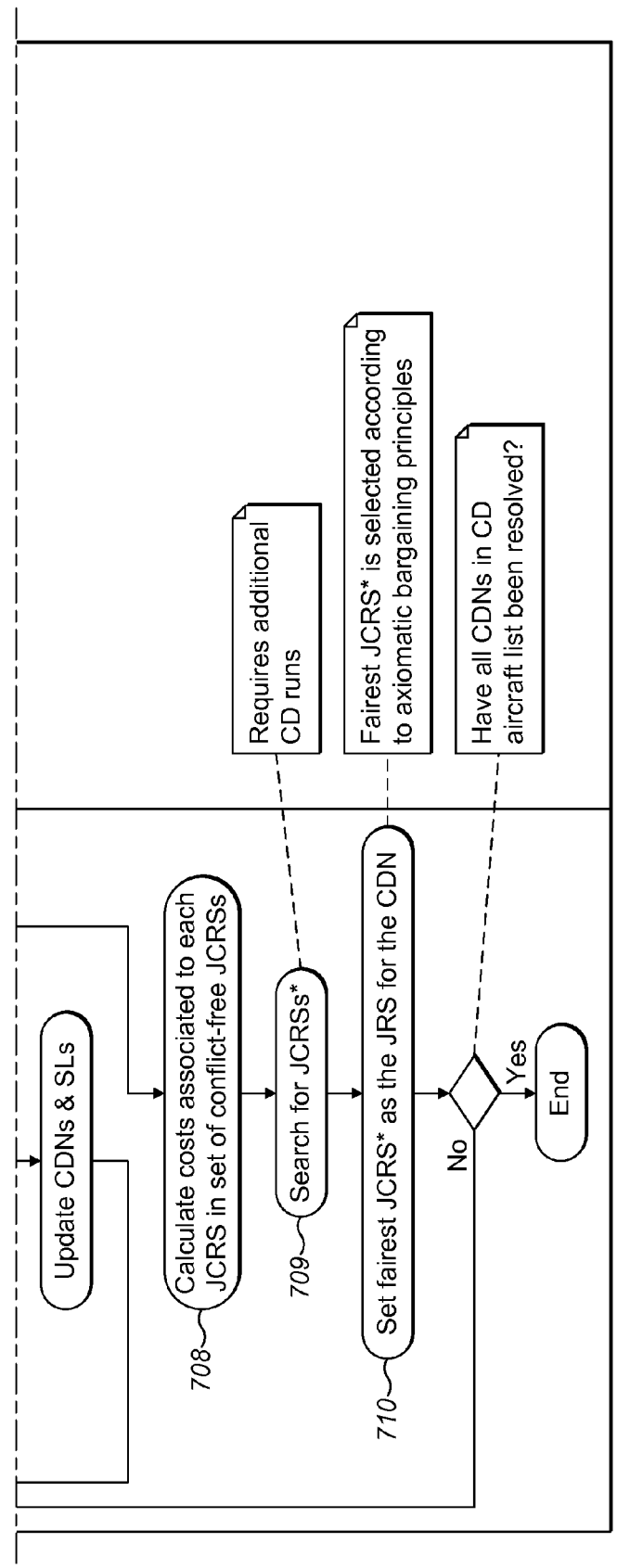

Considering the different concepts introduced above, there follows a brief step-by-step description of a full run of the conflict resolution process 120, which is schematically explained by FIG. 10.

When a run of the conflict detection process 110 is completed at 701, the conflict detection process 110 calls the conflict resolution process 120 at 702. The conflict detection process 110 provides the conflict resolution process 120 with the required conflict-related information, namely conflict dependent networks and conflict sub-lists.

The conflict resolution process 120 proceeds one conflict dependent network at a time starting at 703, simultaneously considering all the conflicts in a sub-list.

For any network CDNj, the resolution of the conflicts in SLj is based on a set of joint candidate resolution patterns (JCRPs) for CDNj. A JCRPj is a JCRSj made up of candidate resolution patterns, $JCRP_j = \{CRP_1^j, \ldots, CRP_i^j, \ldots, CRP_{n_j}^j\}$. To generate a JCRPj at 704, a candidate resolution pattern must be assigned to each of the aircraft in CDNj. In principle, any allowable candidate resolution pattern for $A_i^j$ could be selected as $CRP_i^j$. The only restriction on the candidate resolution patterns in JCRPj comes from the fact that, when a conflict involves two aircraft with no earlier conflicts in SLj, at least one of the two aircraft must act upon the conflict. Consequently, the candidate resolution pattern assigned to at least one of the two aircraft must include an alternative sequence of instructions that changes the aircraft intent and trajectory prior to the initiation of the conflict interval (the sequence must be triggered before the conflict starts). A series of heuristics will be in place to guide the selection of allowable candidate resolution patterns for $A_i^j$ and the definition of the parameters and trigger conditions of the alternative sequences included in the selected candidate resolution patterns, as described above. These heuristics will be based on the preferred intent of $A_i^j$ and the attributes of the conflicts in which it is involved. For example, the position of the conflict interval along the prediction timeline will help determine the triggers of the alternative instructions and the intensity and duration of the conflicts will help define the values of their parameters.

At 705, the conflict detection process 110 is called by the conflict resolution process 120 to check whether the generated JCRPjs are conflict-free. If no conflict-free JCRPjs can be found at 706, heuristic methods are employed at 707 to extend CDNj by including the aircraft 16 interfering with the JCRPjs. Thus, it is implicitly assumed that the reason why the allowable joint conflict resolution patterns do not result in a conflict-free conflict dependent network is because they create conflicts with aircraft 16 outside the network. If an interfering aircraft 16 is itself including in a conflict dependent network, then that conflict dependent network must be considered in combination with CDNj for conflict resolution.

The resulting conflict-free JCRSjs are considered as the initial JCRSjs to initiate the search for Pareto-optimal conflict-free $JCRS_j^*$s at 708.

A subset of the Pareto set, i.e. set of conflict-free $JCRS_j^*$ s is built at 709. To generate this subset, the minimization problem in (6) must be repeatedly solved for different sets of values for the weights, so as to obtain Pareto-optimal solutions that cover all areas of the Pareto set. To resolve the minimization problem, a stochastic optimization algorithm is employed. This algorithms will search for the minimum of w(JCRSj) from among JCRSjs generated from the initial joint conflict resolution patterns by randomizing the parameters and trigger conditions of the alternative instructions introduced in the $CRP_i^j$s.

Once a set of conflict-free Pareto-optimal solutions $JCRS_j^*$s is available, the most equitable solution among the ones obtained is selected at 710 as the joint resolution strategy for CDNj, denoted as JRSj.

Steps 3 to 7 are performed for each of the identified conflict dependent networks. The Joint Resolution Strategy for all the conflicting aircraft is the combination of the JRSjs obtained for the different CDNjs Further Example of Conflict Resolution A further example of conflict resolution with regard to equity or fairness is now presented. This second example provides further details of how equity or fairness may be measured, and hence used when amending trajectories to resolve conflicts.

This embodiment employs a method of conflict resolution 130 that seeks to remove any conflicts and assure safe separation of aircraft 16. Then, the revised aircraft intent data 28b undergoes an optimisation process where the revisions to the aircraft intent data 28b are measured in terms of fairness and further revisions to the aircraft intent data 28b are made to improve fairness while ensuring safe separation is maintained. The initial method of conflict resolution may be as described above, or may any method of conflict resolution that sees revisions of aircraft intent data 28b being generated.

First, an explanation is provided as to the difference between what is meant by equitable and what is meant by fair. Fairness implies achieving a balance of conflicting interests and represents a potential tension between what someone wants to do and what can be bad for another within a just framework. Fairness usually has some reflection of relative needs. Equity is a special case of fairness and implies an equal treatment of all concerned, irrespective of different needs. To demonstrate the difference, consider two hungry friends that each want to buy a slice of pizza from a vendor who has only one slice left to sell. In this case, it would be just for them to share the slice of pizza. An equitable way of sharing the slice would be to divide the slice into two identical portions, one for each friend. A fair way of dividing the slice would be to take into account each of the two friends hunger and to divide the slice proportionately to each friend's hunger.

This sense of fairness can be extended as a consideration of airlines preferences when resolving conflicts, i.e. changes to aircraft intent may be made that reflects fairly airlines preferences. This is related to the fact that each airline has a strategy in order to make what it sees as the best use of its different flights. This strategy is associated with how a flight is planned and executed, and may reflect different attitudes to flight costs such as time delays and increased fuel consumption. These costs may be characterised by a cost function, as is explained more fully below.

Any modification to the original planned trajectory may alter the incurred costs of a given flight. By means of this cost function, the importance of the cost definition when revising the trajectory of a specific flight can be understood. Then, revisions may be made to trajectories that accommodate the airline preferences and maintain their preferred cost function for a given flight.

The cost function has flight specific coefficients that are defined by each airline according to its strategy. A cost index is used to explain the meaning of these flight specific coefficients, and is used when revising the trajectory of a flight. The use of a cost index leads to the definition of the penalty function, which represent the penalty level incurred when deviating from the airline's user preferred cost for a specific flight according to their user preferred trajectory. The penalty function provides a metric for measuring fairness and equity when revising trajectories, and hence allows the most equitable or fair conflict resolution strategy to be identified, e.g. from the possible joint conflict resolution strategies described above.

Each cost function has fixed cost related to the aircraft model and variable cost depending on the airline's preferred strategy.

$$C = C_{fixed} + C_{variable} \quad (7)$$

The fixed cost Cfixed is independent of the trajectory flown and accounts for, e.g., insurance costs, personal equipment costs, crew trainings costs, etc.

The variable cost Cvariable is a function of the time related cost and of the cost associated to the fuel consumption for a given flight. Time related costs account for maintenance of the aircraft, ownership or leasing of an aircraft, the crew cost per hour and also the repercussion of passenger satisfaction, missed connections and compensation etc. Fuel costs depend on the amount of fuel consumed and this depends upon how the aircraft is flown (for example speed, altitude, and descent and climb profiles and hence follows from the trajectory). The variable cost coefficient maybe expressed as $$C_{variable} = C_T \cdot \Delta T + C_F \cdot \Delta F \quad (8)$$

where CT and CF are flight specific coefficients integrated in the cost function for each flight according to the airline's preferred strategy. CT defines the time-related cost per minute of flight and CF defines the cost of fuel per kg.

The aim when revising trajectories is to minimize the total flight costs, achieved by minimising the variable cost. This requires minimising the flight duration and/or minimising the fuel consumption. The cost index indicates how the airline regards the relative importance of reducing the time related cost against the fuel related cost. The ratio between CT and CF defines the cost index CI, i.e.

$$CI = \frac{C_T}{C_F}. \quad (9)$$

As an example, a first airline offers a premium service and has built on its image of punctuality to gain the reliance of its clients. Hence, airline A weights the time related cost as more important than the fuel related cost. A second airline's image is based on selling cheap flight tickets. For this airline, the fuel related cost is more important than the time related cost. Thus, the cost index of airline A has a higher value than the cost index of airline B.

When the airborne automation system 20 generates the user preferred aircraft intent data 28a that describes the user preferred trajectory of the aircraft 16, it accounts for the user preferred costs by defining the user preferred flight duration and the user preferred fuel consumption. Hence, the user preferred aircraft intent data 28a reflects the cost index of the airline. The user preferred cost can only be achieved if the user preferred trajectory is flown and this is not always possible. Where the user preferred trajectory must be revised as part of the conflict resolution process 120, the airline's preferences regarding flight costs may be taken into account such that the revised aircraft intent data 28b matches as close as possible the user preferred flight cost.

The increased flight cost resulting from the revised aircraft intent data 28b is reflected in two main variables, namely the difference in the flight duration $\Delta T$ and the difference in the fuel consumption $\Delta F$, with $$\Delta T = T_M - T_P \quad (10)$$

$$\Delta F = F_M - F_P \quad (11)$$

where TP and FP are the user preferred time and fuel costs respectively, and TM and FM are the revised time and fuel costs respectively.

The cost model used assumes that the airline does not incur extra costs when the flight duration is shortened or when less fuel is consumed. Also, each flight is assumed to have a maximum acceptable incurred cost which is correlated to specific values for the increase in flight duration and fuel consumption. The maximum acceptable cost is defined by a pair of reference values of flight duration and fuel consumption, TREF and FREF respectively. The acceptable delay is defined as the difference between the so defined "reference" flight duration TREF and the user preferred flight duration Tp, and similarly for the acceptable increase in fuel consumption.

$$\Delta T_{REF} = T_{REF} - T_P \quad (12)$$

$$\Delta F_{REF} = F_{REF} - F_P \quad (13)$$

Because fairness has to take into account acceptance levels and satisfaction, the maximum acceptable values determined by the airline are relevant to the metric.

The reference values TREF and FREF do not constrain the modified values TM and FM, which can exceed the reference values, but they represent a pair of maximum acceptable levels as defined by the airline.

Each additional cost represents a cost penalty to the airline's preferred strategy. The cost penalty has a maximum value when the tolerable incurred cost defined by the airline through the pair TREF and FREF is exceeded. For any further cost increments beyond the maximum acceptable additional cost, the cost penalty stays constant at its maximum value.

In order to measure the cost penalty, a penalty function is used. This penalty function is a function of the revised flight duration TM and fuel consumption FM, and the user preferred values for flight duration TP and fuel consumption FP.

$$P = f(T_M, F_M, T_P, F_P) \quad (14)$$

In practice, TP and FP are fixed values either declared directly as part of the user preferred aircraft intent data 28a or may be deduced from the user preferred aircraft intent data 28a. TM and FM depend on the revisions made to the user preferred trajectory according to the revised aircraft intent data 28b.

The required penalty function obeys the following constraints:

No cost penalty is incurred when TM is equal or less than TP, and no cost penalty is incurred when FM is equal or less than FP. In such cases, the penalty function equals zero.

$$P(T_M, F_M, T_P, F_P) = 0 |_{T_M \leq T_P, F_M \leq F_P} \quad (15)$$

ii) The penalty function adopts a strictly positive value, when TM is greater than TP and for any FM $$P(T_M, F_M, T_P, F_P) = 0 |_{T_M > T_P} \quad (16)$$

iii) The penalty function adopts a strictly positive value, when FM is greater than FP and for any TM $$P(T_M, F_M, T_P, F_P) = 0 |_{F_M > F_P} \quad (17)$$

iv) The cost penalty has a maximum value, thus the penalty function is saturated when that maximum value is reached. The maximum value is referred to as PSAT.

v) The penalty function reaches PSAT, for example, when TM is equal TREF and when FM is equal FREF. The maximum acceptable cost, as determined by the airline, corresponds to the maximum acceptable delay and maximum tolerable increase in fuel consumption. TREF and FREF are in turn used to define the value of the maximum cost penalty PSAT:

$$P_{SAT} = P(T_M = T_{REF}, F_M = F_{REF}, T_P, F_P) \quad (18)$$

PSAT could be equal to zero for the case where TREF=TP and FREF=FP. In order to avoid that case, either TREF or FREF (or both) must be strictly greater than TP and FP, respectively. This means, that at least one of the two following inequalities must be true:

$$T_{REF} > T_P \quad (19)$$

$$F_{REF} > F_P \quad (20)$$

vi) The penalty function is also saturated for certain combinations of values for TM and FM. There are two special cases, where PSAT is reached even if one of the values of TM or FM is maintained at its preferred level (TP or FP, respectively). For the case where FM equals FP, PSAT is reached for a value of TM, denoted as TSAT, which is implicitly defined as:

$$P(T_M = T_{REF}, F_M = F_P, T_P, F_P) = P_{SAT} \quad (21)$$

Corollary to v) and vi):

$$T_{SAT} \geq T_{REF} \quad (22)$$

vii) For the case where TM equals TP, PSAT is reached for a value FM, denoted as FSAT, which is implicitly defined as:

$$P(T_M = T_M, F_M = F_{SAT}, T_P, F_P) = P_{SAT} \quad (23)$$

Corollary to v) and vii):

$$F_{SAT} \geq F_{REF} \quad (24)$$

viii) Any increment in the values of TM or FM or both results in an increment of the penalty value because any increment of TM and FM with respect to TP and FP represents an additional cost incurred in flying the revised trajectory. The maximum value for the penalty function is PSAT. Thus, the penalty function is a monotonically increasing function, which is comprehended between the values zero and PSAT.

$$P \in [0, \ldots P_{SAT}] \quad (25)$$

Any function P can be used as penalty function as long as the set of variable properties and mathematical requirements described above are respected. An example of a penalty function is $$P = \sqrt{C_T^2 (T_M - T_P)^2 + C_F^2 (F_M - F_P)^2} \quad (26)$$

According to i) above, for TM≤TP and FM≤FP it is assumed that P=0.

Condition v) leads to the following result:

$$P_{SAT} = \sqrt{C_T^2 (T_{REF} - T_P)^2 + C_F^2 (F_{REF} - F_P)^2} \quad (27)$$

Conditions vi) and vii) above lead to the following result:

$$T_{SAT} = T_P + \frac{P_{SAT}}{C_T} \quad (28)$$

$$F_{SAT} = F_P + \frac{P_{SAT}}{C_F} \quad (29)$$

Furthermore, it shall be contemplated a possible set of values TM and FM for which $$\sqrt{C_T^2 (T_M - T_P)^2 + C_F^2 (F_M - F_P)^2} \geq P_{SAT} \quad (30)$$

In such a case, P shall be limited to PSAT.

The following table summarises the penalty function for different intervals of TM and FM.

| $P(T_M, F_M, T_P, F_P)$ | $F_M \leq F_P$ | $F_M$ $F_P < F_M < F_{SAT}$ | $M \geq FSAT$ |
|---|---|---|---|
| $TN < TP$ | 0 | $C_F\sqrt{(F_M-F_P)^2}$ | $P_{SAT}$ |
| $TP < TN < TSAT$ | $C_T\sqrt{(T_M-T_P)^2}$ | $\min\left\{\dfrac{\sqrt{C_T^2(T_M-T_P)^2 + C_F^2(F_M-F_P)^2}}{P_{SAT}}\right\}$ | $P_{SAT}$ |
| $TN > TSAT$ | $P_{SAT}$ | $P_{SAT}$ | $P_{SAT}$ |

Returning to the example of a first airline that prioritises punctuality, it will be realised that this airline will reach the saturation value of the penalty function PSAT for a smaller increase of the flight duration than the second, low-cost airline. Conversely, the first airline will tolerate a greater increase of the fuel consumption before reaching PSAT.

Taking into account the weight the airline gives to the time related and fuel related cost helps to maintain the incurred cost closer to the preferred cost when revising aircraft intent data and hence trajectories. That is one important reason for including the cost index as part of the function describing the cost penalty. Taking into account the definition for the cost index, $$CI = \frac{C_T}{C_F} \quad (31)$$

the penalty function can also be expressed as $$P = \sqrt{C_T^2(T_M-T_2)^2 + C_F^2(F_M-F_P)^2} = C_F\sqrt{CI^2(T_M-T_P)^2 + (F_M-F_P)^2} \quad (32)$$

The proposed unit dimensions for the variables are:
P, PSAT [€]
TM, TP, TREF, TSAT [min]
FM, FP, FREF, FSAT [kg]
CI [kg/min]
CT [€/min]
CF [€/kg]

While comparing the different penalty values defined above allows fair revisions of aircraft intent data to be identified, it is preferred to use a common context to compare the values resulting from each penalty function for each flight. Using dimensionless variables allows the required comparisons, so a dimensionless penalty function is defined which is referred to as the relative penalty function:

$$\varphi = \frac{P}{P_{max} + K} + \frac{P}{P_{SAT} + K} \quad (33)$$

where κ is a strictly positive value much smaller than PSAT.

The relative penalty function shows the percentage of the cost penalty that was incurred to a single flight compared to the maximum cost penalty value determined by the airline.

The dimensionless penalty function has the following properties:

The dimensionless penalty function is maximal when the penalty function is also maximal.

$$\varphi_{max} = \frac{P_{SAT}}{P_{SAT} + K} \quad (34)$$

b) The dimensionless penalty function is minimal when the penalty function is also minimal.

$$\varphi_{min} = \frac{0}{P_{SAT} + K} = 0 \quad (35)$$

The relative penalty function is a monotonically increasing function, which is comprehended between the values zero and one, $$\varphi \in [0, \ldots 1].$$

When measuring the fairness of revised trajectories, it is useful to use a utility function that reflects satisfaction with the amendments rather than penalties. The utility function is defined to measure the satisfaction of an airline regarding the cost incurred when a flight is deviated from the user preferred trajectory, and thus deviated from the user preferred cost defined by the airline's preferred strategy. A dimensionless utility function is used that reflects the percentage satisfaction that was achieved for a single flight, and is related to the dimensionless penalty function as follows.

$$u = 1 - \varphi = 1 - \frac{P}{P_{SAT} + K} \quad (36)$$

The overall satisfaction across a number of revised trajectories may be found by calculating the arithmetic mean of the results of the utility function. However, such a method pays no attention to the spread of values achieved. That is to say, the same arithmetic mean may arise from widely spread values as from narrowly spread values. Using a geometric mean helps penalise against widely spread values as they result in a lower value. With this in mind, a fairness metric is used that combines both the arithmetic and geometric means. The fairness metric evaluates whether satisfaction is distributed in an equal manner and also penalises dispersion within the distribution. The fairness metric is expressed as $$\Phi = \frac{\left(\prod_{i=1}^{n}(1-\varphi_i)\right)^{\frac{1}{n}}}{\sum_{i=1}^{n}(1-\varphi_i)} \cdot n \quad (37)$$

This fairness metric may then be used to compare joint candidate resolution strategies produced during an iteration of conflict resolution 130, to quantify the strategies in terms of fairness, and to select the fairest joint candidate resolution strategy from the alternatives. The fairness metric is based upon the penalty function that reflects the balance of the two conflicting interests of time-related and fuel-related costs. This balance is incorporated in the penalty function as the airline's cost index. The relative penalty function describes the cost penalty incurred relative to the maximum cost penalty PSAT, which is defined by the reference values TREF and FREF. These reference values are an instrument at the airline's disposal for expressing the maximum cost penalty it can tolerate for a given flight. The fairness metric describes how far the additional incurred cost is from the maximal penalty cost, thereby reflecting the satisfaction of the airline, by including the formula $(1-\phi)$.

As mentioned above, a joint candidate resolution strategy may be chosen that is the most equitable rather than the most fair. In this case, regard need not be made to the airlines cost indices and maximum penalty costs. Rather than using the fairness metric, the following equity metric is used $$E = \frac{\left(\prod_{i=1}^{n}(P_i + e)\right)^{\frac{1}{n}}}{\sum_{i=1}^{n}(P_i + e)} \cdot n \quad (38)$$

where e is a positive value in order to ensure that when the cost penalty is zero for one flight, the equity does not result in zero. Similar to the fairness metric, the equity metric is maximal when the cost penalty has been equally distributed among all. In that case the equity E=1.

Now that fairness and equity have been described in the context of single flights, their application to a system of many flights will now be described. This is of course important as its application in air traffic management will require a consideration of all flights under the control of the air traffic management.

The set of airlines is the set composed of all airlines with aircraft under the responsibility of a particular air traffic management facility 12. Each airline is represented by the element aj and the total number of airlines is m, such that $$\tilde{A} = \{\forall a_j \mid_{j=1\ldots m}\} = \bigcup_{j=1}^{m} a_j \quad (39)$$

The set of reviewed airlines is characterised by A, such that $A \subseteq \tilde{A}$.

There is a set of all flights belonging to airline j (under the control of the air traffic management facility 12), with each flight defined by an element $f_i^j$ and with the set defined by $$F_j^{ARL} = \{\forall f_i^j \mid_{i=\ldots n_j}\} \quad (40)$$

The set of all flights under the responsibility of the air traffic management facility 12 is defined as $$\tilde{F} = \{\forall f_i^j \mid_{i=1\ldots n_j, j=1\ldots m}\} = \bigcup_{j=1}^{m} F_j^{ARL} \quad (41)$$

The set of reviewed flights is characterised as $F \subseteq \tilde{F}$.

For each airline, operating n flights, the relative importance of each flight i to the airline's preferred cost strategy is accounted for using a weight wi, with the following condition $$\sum_{i=1}^{n} w_i = 1 \quad (42)$$

This allows the airline to set the relative importance of each of its flights. This reflects the fact that some flights are more important to an airline than others. For example, some flights will occur on premium routes and so will want prominent weighting or a flight's timing may be important as its arrival is scheduled to be just before a number of connecting flights depart.

The penalty cost to an airline j is equal to the sum of the penalty costs of each flight multiplied by the flight's weight $$P_j^{ARL} = \sum_{i=1}^{n} w_i P_i \quad (43)$$

where Pi is the penalty cost to flight i. Then, the saturated penalty of an airline j is given by the weighted sum of all saturated costs of the flights $$P_{SAT,j}^{ARL} = \sum_{i=1}^{n} w_i P_{SAT,i} \quad (44)$$

where PSAT,i is the penalty cost to flight i.
An airline's relative penalty cost is given by $$\varphi_j^{ARL} = \frac{P_j^{ARL}}{P_{SAT,j}^{ARL} + K} = \frac{\sum_{i=1}^{n} w_i P_i}{\left(\sum_{i=1}^{n} w_i P_{SAT,i}\right) + K} \quad (45)$$

The system's relative penalty cost is defined by the average relative penalty cost of all m airlines and is calculated from $$\bar{\varphi}^{SYS} = \frac{\sum_{j=1}^{m} \varphi_j^{ARL}}{m} \quad (46)$$

The deviation of the relative cost penalty of an airline j with respect to the system's relative penalty cost is defined as $$d_j = |\bar{\varphi}^{SYS} - \phi_j^{ARL}| \quad (47)$$

and the deviation of the relative penalty cost of flight i with respect to the airline's relative penalty cost is defined as $$d_j^i = |\phi_j^{ARL} - w_i \phi_i| \quad (48).$$

Figure 11:
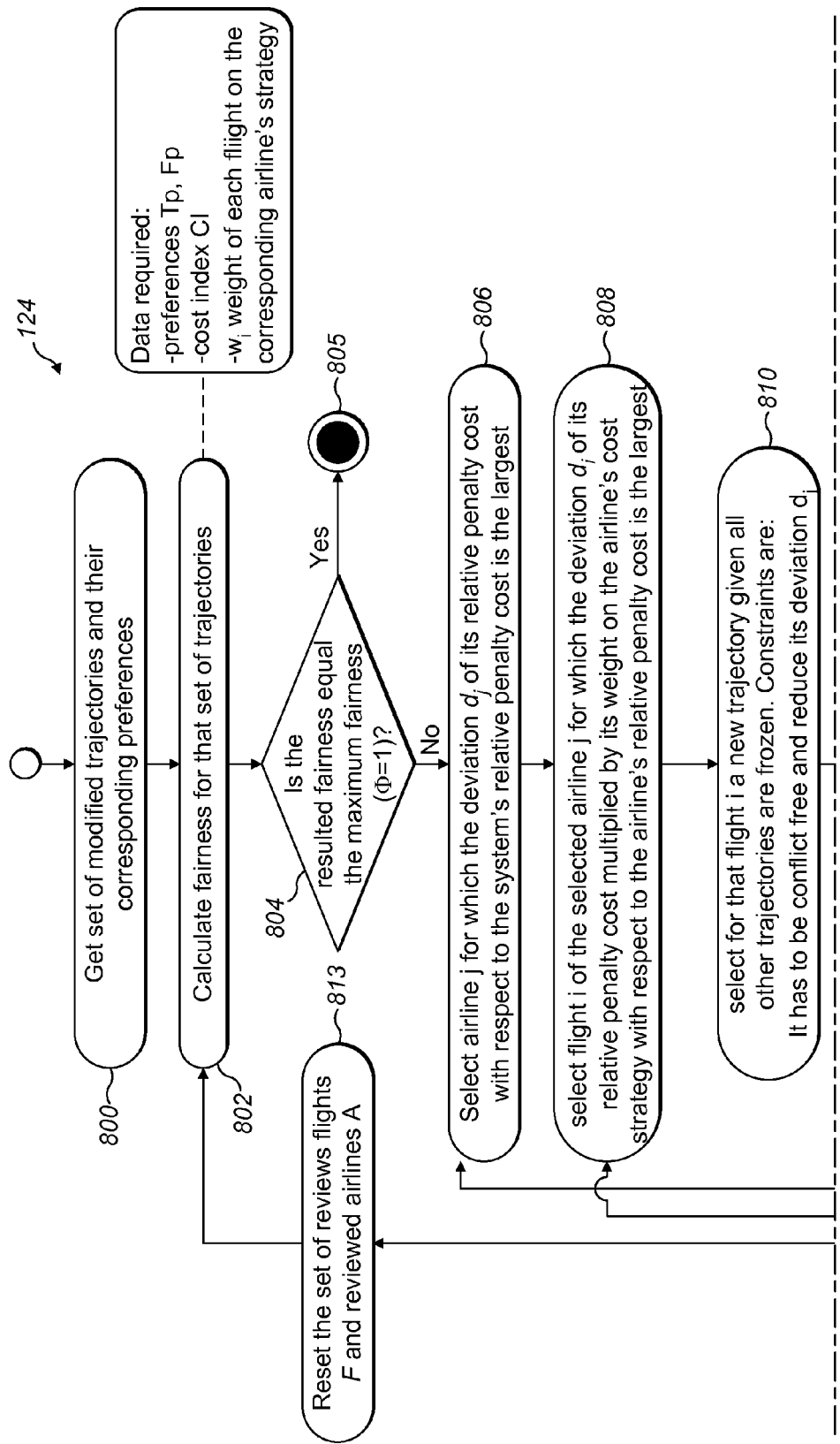
FIG. 11 is a flow chart representation of a method of selecting a joint candidate resolution strategy according to fairness.
Figure 11:
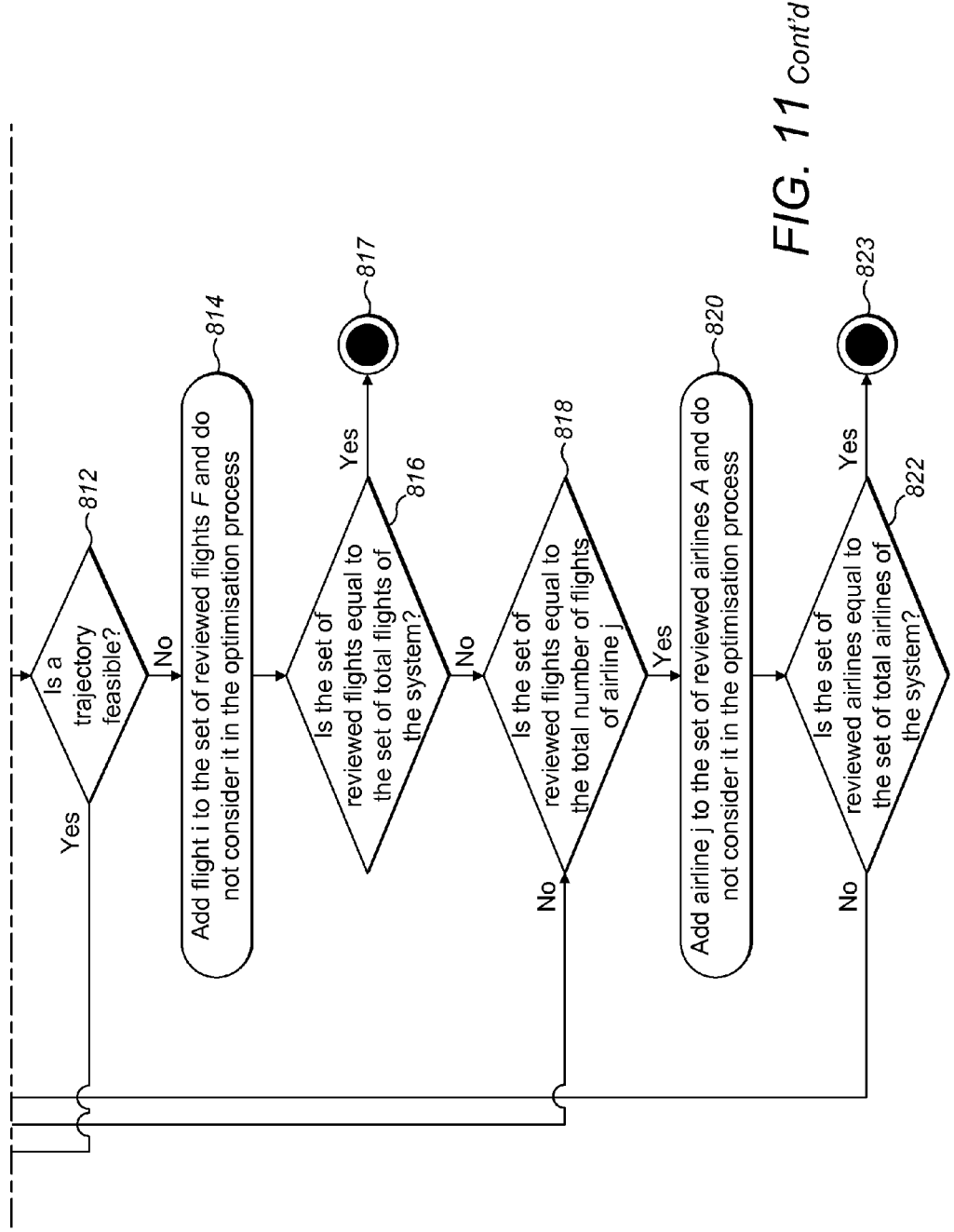

The above equations may be used to order flights and airlines according to those suffering the most unfair revision of trajectories. That is, it allows a list of airlines to be ordered by decreasing deviation of their relative penalty cost from the system's average penalty cost, and also allows a list of flights of an airline to be ordered by decreasing weighted deviation of their relative penalty cost from the airlines relative penalty cost. These lists may be generated as part of the step of selecting a joint candidate resolution strategy shown in FIG. 5 at step 124. The method employed at step 124 is shown in detail in FIG. 11.

The method begins at step 800 where a set of revised aircraft intent data 28b generated during a preceding conflict resolution procedure 130 is retrieved. The corresponding revised trajectories are calculated, and the corresponding set of user preferred aircraft intent data 28a are retrieved and their corresponding user preferred trajectories are calculated.

At step 802, the fairness of the set of revised trajectories is calculated as follows. First, the relative penalty cost for each flight $\phi$ is calculated from equation (33) above. Then, from the relative penalty costs for each flight, the overall fairness metric $\Phi$ is calculated from equation (37) above.

With the above calculation complete, at step 804 the overall fairness metric $\Phi$ is tested to see if it is maximal, i.e. does $\Phi=1$. If yes, no further action is needed and step 124 exits at step 805. If the fairness is not maximal, the method continues to step 806 where a process of further revising aircraft intent data 24 begins.

First, the airlines and their flights must be ordered to identify those most unfairly amended. To this end, the following calculations are performed.

Using each flight's relative penalty cost $\phi$, each airline's relative penalty cost $\phi_j^{ARL}$ may be calculated according to equation (45) above.

The system's average relative penalty cost $\overline{\phi}^{SYS}$ is calculated from the airlines' relative penalty costs according to equation (46) above.

The deviation $d_j$ of the each airline's relative penalty cost from the system's relative penalty cost is calculated according to equation (47) above.

The deviation $d_j^i$ of each flight's relative penalty cost from the associated airline's relative penalty cost is calculated according to equation (48) above.

The airline showing the greatest deviation of its relative cost penalty from the system's relative cost penalty as defined at equation (47) is found from the list of all airlines. Thus, the airline facing the greatest lack of fairness is selected for processing first. For this airline, at step 808, the flight of that airline showing the greatest deviation in its relative cost penalty from the airline's relative penalty cost according to equation (48) above is identified from the list of all flights for that airline. That is, the flight suffering most from a lack of fairness is selected first for processing. The aircraft intent data 28 of this flight is then amended at step 810 to produce revised aircraft intent data 28b. All other aircraft intent 28 for all the other flights are kept frozen at this stage. The trajectory corresponding to the revised aircraft intent data 28b is then calculated and tested against the other trajectories to ensure that it remains conflict free and results in a lower relative cost penalty.

At step 813, a determination is made as to whether an improved trajectory has been found. If yes, the method returns to step 802, via step 813 where a record of reviewed airlines and reviewed flights is updated, i.e. that flight is removed from the list for that airline so it is not considered further. If no, the method continues to step 814, where the last reviewed flight is moved to a list of reviewed flights so that it is not reviewed again.

The method continues to step 816 where a check is made to see if all flights of the system have now been reviewed. If yes, step 124 exits at step 817. If no, the method continues to step 818 where a check is made to see if all flights for the current airline have been reviewed. If not, the method returns to step 808. As the last reviewed flight has been moved out of the list of flights to be reviewed, another flight now appears in that list as having the highest deviation in relative cost. This flight is chosen for processing. Hence, the method steps through the flights for an airline sequentially, going from the flight with the highest deviation in relative cost to the next highest, and so on. If, at step 818, it is determined that all flights of an airline have been reviewed, the method continues to step 820 where that airline is moved to a list of reviewed airlines to ensure it and its flights are not reviewed again. The method then returns to step 806. As the previous reviewed airline has been moved out of the list of airlines to be reviewed, another airline now appears as having the highest deviation of its relative penalty. This airline is selected for review. Hence, the airlines are reviewed sequentially starting with the airline with highest deviation in relative penalty, then moving on to the next highest deviation and so on.

In this way, step 124 loops through all airlines and all flights and seeks to improve the aircraft intent data to achieve the fairest distribution of trajectory revisions, and prioritises the airlines and flights with the greatest deviation from fairness. To ensure the method runs as efficiently as possible, the revision of trajectories starts with the flight having the greatest deviation in relative penalty from the airline with the greatest deviation in relative cost. The method then proceeds in order of greatest deviations, flight by flight and then airline by airline. The end result is a set of aircraft intent data 28 including further revisions to the revised aircraft intent data 28b to ensure revisions to the aircraft intent data 28b are distributed as fairly as possible.

Variations

It will be clear to the skilled person that modifications may be made to the embodiments described above without departing from the scope of the disclosure.

For example, the present disclosure enjoys particular benefit when applied to air traffic management dealing with the most challenging scenario of predominantly converging paths such as terminal arrivals. Nonetheless, the present disclosure will of course also bring benefits to less challenging environments like diverging paths as for terminal departures and also crossing paths.

It will be appreciated that the location of parts of the present disclosure may be varied. For example, trajectories may be calculated by ground-based or air-based systems. For example, the air traffic management may be ground-based, but need not necessarily be so. The air traffic management need not be centralized. For example, a distributed air-based system could be possible.

Different air traffic management may cooperate and share information. For example, air traffic management having responsibility for adjacent airspaces may pass trajectory information for aircraft anticipated to cross between the adjacent airspaces.

The invention claimed is:

1. A method of managing airspace through which a plurality of aircraft are flying, comprising:
   obtaining user preferred aircraft intent data that describe unambiguously user preferred trajectories to be flown by each aircraft through the airspace;
   obtaining a user preferred time of arrival for each aircraft;
   calculating the user preferred trajectories from the user preferred aircraft intent data;
   detecting one or more conflicts in the user preferred trajectories, and identifying the conflicted aircraft predicted to fly the detected conflicting trajectories;

revising the user preferred aircraft intent data of at least one of the conflicted aircraft to produce revised aircraft intent data having a corresponding revised trajectory;

for each revised trajectory, calculating a penalty function value, wherein the penalty cost function comprises a function of, for each of the plurality of aircraft, a corresponding revised flight duration, a corresponding fuel consumption, a corresponding user preferred value for flight duration, and a corresponding user preferred value for fuel consumption, and further revising the revised aircraft intent data of at least one aircraft to produce a corresponding trajectory such that the penalty function values are distributed among the conflicted aircraft subject to revised trajectories more equitably or more fairly;

sending revised aircraft intent data to the corresponding conflicted aircraft; and ordering a change of at least one of speed and direction of the corresponding conflicted aircraft.

2. A computer-implemented method of managing airspace through which a plurality of aircraft are flying, comprising:

obtaining user preferred aircraft intent data that describe unambiguously user preferred trajectories to be flown by each aircraft through the airspace;

obtaining a user preferred time of arrival for each aircraft;

calculating the user preferred trajectories from the user preferred aircraft intent data;

detecting one or more conflicts in the user preferred trajectories, and identifying the conflicted aircraft predicted to fly the detected conflicting trajectories;

revising the user preferred aircraft intent data of at least one of the conflicted aircraft to produce revised aircraft intent data having a corresponding revised trajectory;

for each revised trajectory, calculating a penalty function value from a time penalty arising from a difference between the user preferred time of arrival and the revised time of arrival of the revised trajectory;

obtaining a user preferred fuel consumption for each aircraft;

for each revised trajectory, calculating the penalty function value arising both from the time penalty and from a fuel penalty arising from a difference between the user preferred fuel consumption and the revised fuel consumption of the revised trajectory;

further revising the revised aircraft intent data of at least one aircraft to produce a corresponding trajectory such that the penalty function values are distributed among the conflicted aircraft subject to revised trajectories more equitably or more fairly;

obtaining a cost index for each aircraft that indicates a preferred weighting between incurring a time penalty or a fuel penalty;

for each revised trajectory, calculating the penalty function value as a weighted combination of the time penalty and the fuel penalty, weighted according to the associated cost index;

sending revised aircraft intent data to the corresponding conflicted aircraft;

obtaining a latest time of arrival and a maximum fuel consumption deemed acceptable for each aircraft; and for each revised trajectory, calculating a relative penalty function value from a ratio of the penalty function value and a saturated penalty function value, wherein the saturated penalty function value is calculated from a weighted combination of a maximum time penalty and a maximum fuel penalty, weighted according to the cost index, and wherein the maximum time penalty arises from a difference between the latest time of arrival and the revised time of arrival of the revised trajectory, and the maximum fuel penalty arises from a difference between the maximum fuel consumption and the revised fuel consumption of the revised trajectory;

wherein the step of further revising the revised aircraft intent data of at least one aircraft to produce a corresponding trajectory is performed such that it is the relative penalty function values that are distributed among the conflicted aircraft subject to revised trajectories more fairly; and ordering a change of at least one of speed and direction of the conflicted aircraft.

3. The method of claim 2, wherein the step of further revising the revised aircraft intent data of at least one aircraft comprises selecting the aircraft with the greatest relative penalty function value, and repeating multiple times the step of further revising the revised aircraft intent data by selecting aircraft by decreasing order of size of their relative penalty function values.

4. The method of claim 2, wherein each of the aircraft is associated with an airline, and the method comprises:

for each airline, calculating an airline relative penalty function value as a combination of the individual relative penalty function values of the aircraft with revised aircraft intent data associated with that airline; and wherein the step of further revising the revised aircraft intent data of at least one aircraft comprises selecting an aircraft from the airline with the greatest airline relative penalty function value, and repeating multiple times the step of further revising the revised aircraft intent data by selecting aircraft from other airlines in decreasing order of the size of their airline relative penalty function values.

5. The method of claim 4, further comprising:

obtaining aircraft weighting data comprising a weighting factor for each aircraft that indicates the relative importance of each aircraft to an airline; and wherein the step of further revising the revised aircraft intent data of at least one aircraft comprises selecting the aircraft with the greatest combination of weighting factor and aircraft relative penalty function value from the airline with the greatest airline relative penalty function value, and then performing further iterations by selecting aircraft in decreasing order of the size of the combination of their weighting factor and their aircraft relative penalty function value from the airline with next highest airline relative penalty function.

6. An airspace management system to deconflict trajectories of a plurality of aircraft comprising one of manned aircraft, unmanned aircraft, and combinations thereof, the airspace management system comprising:

an airborne automation system comprising flight management logic and trajectory computation infrastructure, the airborne automation system in communication with the plurality of aircraft;

a ground-based automation system comprising traffic management logic and trajectory computation infrastructure, the ground-based automation system in communication with the plurality of aircraft;

a corresponding aircraft intent, stored on a non-transitory computer readable storage medium, for each of the plurality of aircraft associated with the airspace management system;

a computer configured to calculate a penalty cost function, wherein the penalty cost function comprises a function of, for each of the plurality of aircraft, a corresponding revised flight duration, a corresponding fuel consumption, a corresponding user preferred value for flight duration, and a corresponding user preferred value for fuel consumption, wherein the computer is further configured to revise the corresponding aircraft intent of at least one aircraft to produce a corresponding trajectory such that the penalty function values are distributed among conflicted aircraft subject to revised trajectories more equitably or more fairly; and a communication system in communication with the computer and configured to provide communication with the plurality of aircraft, the airborne automation system, and the ground-based automation system, and to communicate to one or more of the plurality of aircraft revised trajectories.

7. A computer for managing airspace through which a plurality of aircraft are flying, the computer comprising:
a processor;
a bus connected to the processor;
a communication system configured to communicate with the plurality of aircraft;
a non-transitory computer readable storage medium storing code which, when executed by the processor, performs a method, the code comprising:
computer usable program code for obtaining user preferred aircraft intent data that describe unambiguously user preferred trajectories to be flown by each aircraft through the airspace;
computer usable program code for obtaining a user preferred time of arrival for each aircraft;
computer usable program code for calculating the user preferred trajectories from the user preferred aircraft intent data;
computer usable program code for detecting one or more conflicts in the user preferred trajectories, and identifying the conflicted aircraft predicted to fly the detected conflicting trajectories;
computer usable program code for revising the user preferred aircraft intent data of at least one of the conflicted aircraft to produce revised aircraft intent data having a corresponding revised trajectory;
computer usable program code for, for each revised trajectory, calculating a penalty function value, wherein the penalty cost function comprises a function of, for each of the plurality of aircraft, a corresponding revised flight duration, a corresponding fuel consumption, a corresponding user preferred value for flight duration, and a corresponding user preferred value for fuel consumption, and
computer usable program code for further revising the revised aircraft intent data of at least one aircraft to produce a corresponding trajectory such that the penalty function values are distributed among the conflicted aircraft subject to revised trajectories more equitably or more fairly; and
computer usable program code for sending revised aircraft intent data to the corresponding conflicted aircraft.

8. The computer of claim 7, wherein the code further comprises:
computer usable program code for obtaining a latest time of arrival and a maximum fuel consumption deemed acceptable for each aircraft; and
computer usable program code for, for each revised trajectory, calculating a relative penalty function value from a ratio of the penalty function value and a saturated penalty function value,
wherein the saturated penalty function value is calculated from a weighted combination of a maximum time penalty and a maximum fuel penalty, weighted according to the cost index, and
wherein the maximum time penalty arises from a difference between the latest time of arrival and the revised time of arrival of the revised trajectory, and the maximum fuel penalty arises from a difference between the maximum fuel consumption and the revised fuel consumption of the revised trajectory; and
wherein the computer usable program code for revising the revised aircraft intent data of at least one aircraft to produce a corresponding trajectory is performed such that it is the relative penalty function values that are distributed among the conflicted aircraft subject to revised trajectories more fairly.

9. The computer of claim 8, wherein the computer usable program code for further revising the revised aircraft intent data of at least one aircraft comprises computer usable program code for selecting the aircraft with the greatest relative penalty function value, and computer usable program code for repeating multiple times the step of further revising the revised aircraft intent data by selecting aircraft by decreasing order of size of their relative penalty function values.

10. The computer of claim 8, wherein each of the aircraft is associated with an airline, and wherein the code further comprises:
computer usable program code for, for each airline, calculating an airline relative penalty function value as a combination of the individual relative penalty function values of the aircraft with revised aircraft intent data associated with that airline; and
wherein the computer usable program code for further revising the revised aircraft intent data of at least one aircraft comprises computer usable program code for selecting an aircraft from the airline with the greatest airline relative penalty function value, and computer usable program code for repeating multiple times the step of further revising the revised aircraft intent data by selecting aircraft from other airlines in decreasing order of the size of their airline relative penalty function values.

11. The computer of claim 10, wherein the code further comprises:
computer usable program code for obtaining aircraft weighting data comprising a weighting factor for each aircraft that indicates the relative importance of each aircraft to an airline; and
wherein the computer usable program code for further revising the revised aircraft intent data of at least one aircraft comprises computer usable program code for selecting the aircraft with the greatest combination of weighting factor and aircraft relative penalty function value from the airline with the greatest airline relative penalty function value, and computer usable program code for then performing further iterations by selecting aircraft in decreasing order of the size of the combination of their weighting factor and their aircraft relative penalty function value from the airline with next highest airline relative penalty function.

* * * * *